United States Patent
Sakaguchi et al.

(10) Patent No.: US 10,601,921 B2
(45) Date of Patent: Mar. 24, 2020

(54) INFORMATION PROCESSING DEVICE, INFORMATION PROCESSING SYSTEM, AND INFORMATION PROCESSING METHOD

(71) Applicant: KYOCERA Document Solutions Inc., Osaka (JP)

(72) Inventors: Shoichi Sakaguchi, Osaka (JP); Yoshiyuki Fujiwara, Osaka (JP); Yoshihisa Tanaka, Osaka (JP); Yoshiki Yoshioka, Osaka (JP); Tetsuya Nishino, Osaka (JP); Seiji Onishi, Osaka (JP)

(73) Assignee: KYOCERA Document Solutions, Inc., Tamatsukuri, Chuo-ku, Osaka (JP)

( * ) Notice: Subject to any disclaimer, the term of this patent is extended or adjusted under 35 U.S.C. 154(b) by 148 days.

(21) Appl. No.: 15/897,649

(22) Filed: Feb. 15, 2018

(65) Prior Publication Data

US 2018/0248951 A1 Aug. 30, 2018

(30) Foreign Application Priority Data

Feb. 28, 2017 (JP) .................................. 2017-036956

(51) Int. Cl.
*H04L 29/08* (2006.01)
*H04L 29/12* (2006.01)

(52) U.S. Cl.
CPC .......... *H04L 67/1097* (2013.01); *H04L 67/36* (2013.01); *H04L 61/1582* (2013.01)

(58) Field of Classification Search
CPC .. H04L 67/1097; H04L 67/36; H04L 61/1582

USPC ......................................................... 709/219
See application file for complete search history.

(56) References Cited

U.S. PATENT DOCUMENTS

| | | | | |
|---|---|---|---|---|
| 6,073,209 A | * | 6/2000 | Bergsten | G06F 3/0619 |
| | | | | 707/999.202 |
| 2005/0005138 A1 | | 1/2005 | Awai | |
| 2007/0078910 A1 | * | 4/2007 | Bopardikar | G06F 11/1464 |
| 2012/0254761 A1 | * | 10/2012 | DeWitt | H04N 21/47205 |
| | | | | 715/733 |

(Continued)

FOREIGN PATENT DOCUMENTS

JP 2004-310240 A 11/2004

*Primary Examiner* — Sm A Rahman
*Assistant Examiner* — Chen-Liang Huang
(74) *Attorney, Agent, or Firm* — IP Business Solutions, LLC

(57) ABSTRACT

An information processing device includes a control unit functioning as a receiving unit, a processing unit, and a storage controller, a storage, and a communication unit. Each of a plurality of sheets of data is associated with each predetermined storage device among a plurality of storage devices, and information indicating a correspondence between the plurality of sheets and the predetermined storage devices is stored in the storage in advance. When the receiving unit receives a predetermined storage instruction, the storage controller performs a process of storing data in the storage and causing the communication unit to transmit data indicating the plurality of sheets to storage devices associated with the sheets with respect to each of the plurality of sheets, and stores the transmitted data in the storage devices.

6 Claims, 27 Drawing Sheets

(56) References Cited

U.S. PATENT DOCUMENTS

| | | | |
|---|---|---|---|
| 2015/0026289 A1* | 1/2015 | Nordness | H04L 67/1097 709/213 |
| 2015/0207841 A1* | 7/2015 | Drang | H04N 21/23109 709/219 |
| 2017/0195448 A1* | 7/2017 | Su | H04L 65/4069 |

* cited by examiner

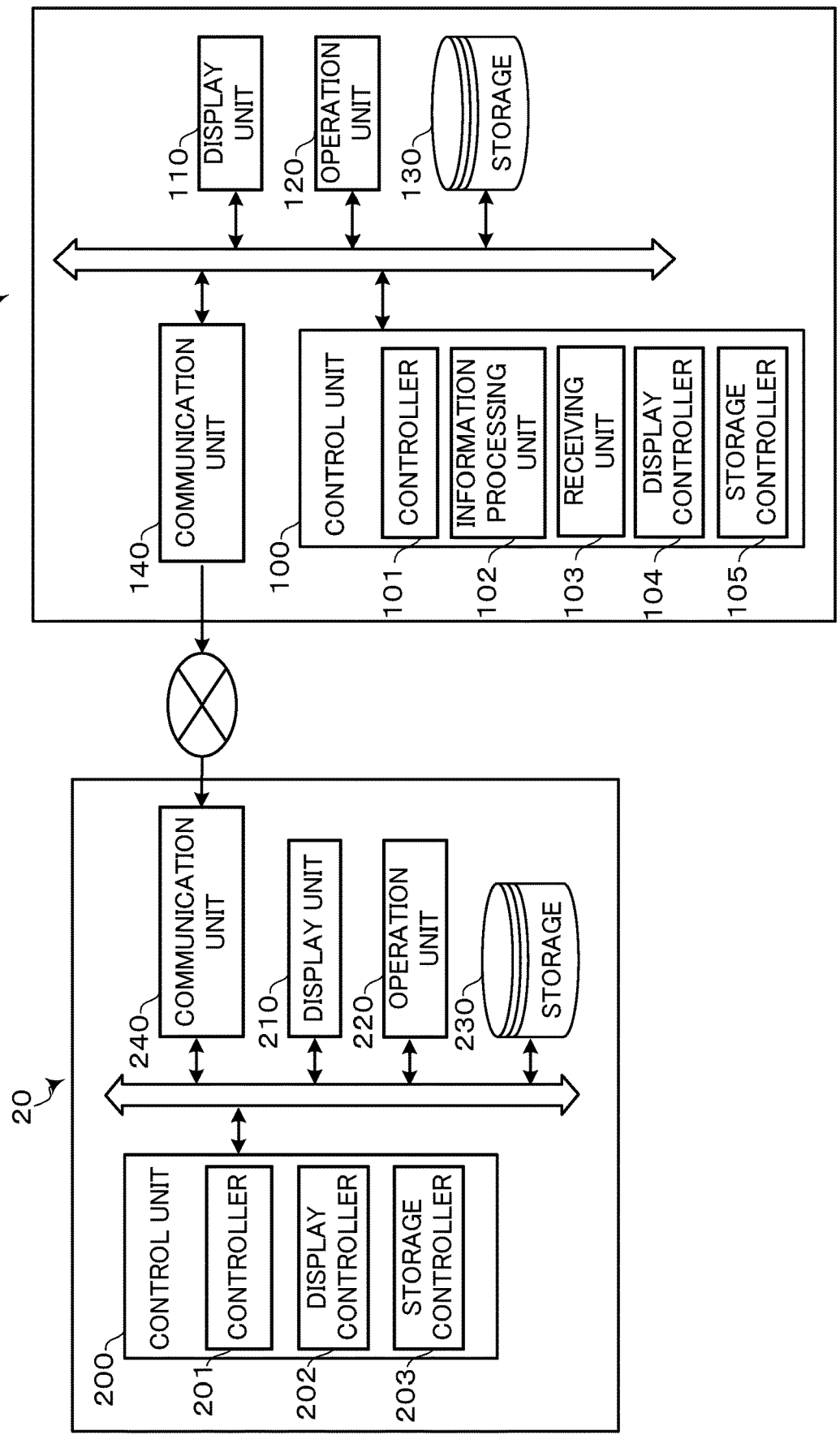

Fig. 17A

| ICON | | PREDETERMINED STORAGE DEVICE | | |
|---|---|---|---|---|
| | | NAME | IP ADDRESS | STORAGE DESTINATION |
| MINUTES.odt | 1 | PERSONAL COMPUTER A | xxx.yyy.zzz.123 | E:¥share |
| | | SERVER A | xxx.yyy.zzz.250 | D:¥document¥share 1 |
| | | SMARTPHONE A | xxx.yyy.zzz.230 | C:¥document¥share |
| ACHIEVEMENT TABLE.calc | 2 | SERVER A | xxx.yyy.zzz.250 | D:¥document¥share 2 |
| | | SERVER B | xxx.yyy.zzz.251 | C:¥share |
| ... | | | ... | |

130

STORAGE

Fig.22

| NAME | PREDETERMINED STORAGE DEVICE | | |
|---|---|---|---|
| | IP ADDRESS | STORAGE DESTINATION | MAIL ADDRESS |
| PERSONAL COMPUTER A | xxx.yyy.zzz.123 | E:¥share | xxx1@yyy.com |
| SERVER A | xxx.yyy.zzz.250 | D:¥document¥share 1 | xxx2@zzz.jp |
| SERVER A | xxx.yyy.zzz.251 | C:¥document¥share | yyy1@zzz.com |
| SMARTPHONE A | xxx.yyy.zzz.230 | D:¥document¥share 2 | zzz2@xyz.com |
| ... | | | |

130
STORAGE

INFORMATION PROCESSING DEVICE, INFORMATION PROCESSING SYSTEM, AND INFORMATION PROCESSING METHOD

INCORPORATION BY REFERENCE

This application claims priority to Japanese Patent Application No. 2017-036956 filed on Feb. 28, 2017, the entire contents of which are incorporated by reference herein.

BACKGROUND

The present disclosure relates to an information processing device, an information processing system, and an information processing method.

In an information processing device such as a personal computer (PC), data created using sentence creation software or spreadsheet software is stored in a storage such as a hard disk drive (HDD) arranged in the information processing device. Technology for transmitting the data stored in such the storage to a storage device such as a server provided externally for the purpose of backup, information sharing, or the like is known.

SUMMARY

As an aspect of the present disclosure, further improved technology of the above technology is proposed.

An information processing device according to an aspect of the present disclosure includes a storage, a communication unit, and a control unit. The communication unit is capable of communicating with a plurality of storage devices via a network. The control unit includes a processor, and functions as a receiving unit, a processing unit, and a storage controller when the processor executes a control program. The receiving unit receives an instruction from a user. The processing unit generates or processes data constituted of a plurality of sheets in response to the instruction received by the receiving unit. The plurality of sheets of the data are associated with predetermined storage devices among the plurality of storage devices and information indicating a correspondence between the plurality of sheets and the predetermined storage devices is stored in the storage in advance. When the receiving unit receives a predetermined storage instruction, the storage controller performs a process of storing the data in the storage and causing the communication unit to transmit data indicating the plurality of sheets to storage devices associated with the sheets with respect to each of the plurality of sheets and stores the transmitted data in the storage devices.

An information processing system according to another aspect of the present disclosure is an information processing system including the above information processing device and the above plurality of storage devices.

Furthermore, an information processing method according to still an aspect of the present disclosure is an information processing method which controls an information processing device including a storage and a communication unit capable of communicating with a plurality of storage devices via a network. The information processing method includes a receiving step, a processing step, and a storage controlling step. In the receiving step, an instruction from a user is received. In the processing step, data constituted of a plurality of sheets is generated or processed in response to the instruction received in the receiving. The storage controlling step performs the storage control on the data generated or processed in the processing step. In the information processing device, the plurality of sheets of the data is associated with predetermined storage devices among the plurality of storage devices and information indicating a correspondence between the plurality of sheets and the predetermined storage devices is stored in the storage in advance. When a predetermined storage instruction is received in the receiving step, in the storage controlling step, a process of storing the data in the storage and causing the communication unit to transmit the data indicating the sheets to the storage device associated with the sheets with respect to each of the plurality of sheets is performed, and the transmitted data is stored in the storage devices.

BRIEF DESCRIPTION OF THE DRAWINGS

FIG. 2 is a block diagram showing an internal configuration of an information processing device according to Embodiment 1 of the present disclosure.

FIGS. 17A and 17B are diagrams illustrating an example of data stored in advance in a storage of the information processing device according to Embodiment 6 of the present disclosure.

FIG. 22 is a diagram illustrating an example of data stored in advance in a storage of the information processing device according to Embodiment 7 of the present disclosure.

DETAILED DESCRIPTION

An information processing device, an information processing system, and an information processing method according to an embodiment of the present disclosure will be described below with reference to the drawings.

Embodiment 1

Figure 1:
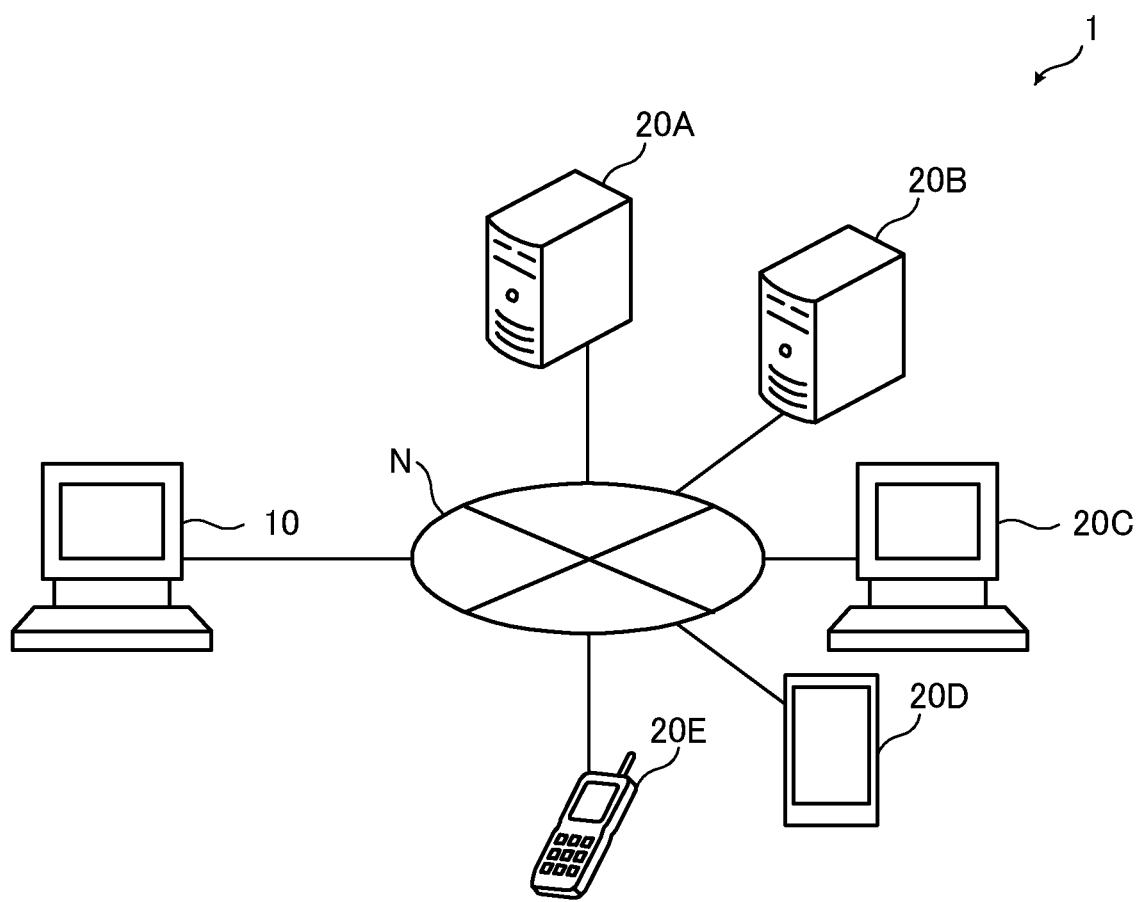
FIG. 1 is a diagram showing a schematic configuration of an information processing system according to Embodiment 1 of the present disclosure.

FIG. 1 is a diagram showing a schematic configuration of an information processing system according to Embodiment 1 of the present disclosure. An information processing system 1 is constituted of an information processing device 10 according to Embodiment 1 of the present disclosure and a plurality of storage devices connected to the information processing device 10 via a network N such as a local area network (LAN) or a wide area network (WAN). In an example illustrated in FIG. 1, a server 20A, a server 20B, a personal computer (PC) 20C, a smartphone 20D, a mobile phone 20E, and the like are connected to the information processing device 10 via the network N. All of the server 20A, the server 20B, the PC 20C, the smartphone 20D, and the mobile phone 20E are examples of a storage device including a storage such as an HDD or a flash memory and are collectively referred to below as a storage device 20 when they need not be particularly distinguished.

FIG. 2 is a block diagram showing an internal configuration of the information processing device 10. The information processing device 10 is a computer such as a PC and includes a display unit 110, an operation unit 120, a storage 130, a communication unit 140, a control unit 100, and the like.

The display unit 110 is constituted to include a liquid crystal display (LCD) or an organic light-emitting diode (OLED) display and displays various operation screens or the like under display control by a display controller which will be described below.

The operation unit 120 is an input device such as a mouse, a keyboard, and a touch panel provided in a front face of the display unit 110. Instructions from a user for various operations and processes that can be carried out by the information processing device 10 are input using the operation unit 120 such as the mouse, keyboard, and touch panel.

The storage 130 is a storage device such as an HDD or a flash memory. The storage 130 includes a plurality of storage areas and a variety of data is stored in the storage areas. In the embodiment, the storage 130 includes a plurality of directories such as a root directory or a sub-directory serving as an underlayer of such a root directory as a plurality of storage areas.

The communication unit 140 is a communication interface including a communication module such as a LAN chip. The information processing device 10 can communicate with a plurality of storage devices 20 connected via the network N using the communication unit 140.

The control unit 100 is constituted to include a processor, a random access memory (RAM), a read only memory (ROM), and a dedicated hardware circuit. The processor is, for example, a central processing unit (CPU), a field programmable gate array (FPGA), an application specific integrated circuit (ASIC), or the like. The control unit 100 functions as a controller 101, an information processing unit 102 (processing unit), a receiving unit 103, a display controller 104, and a storage controller 105 in response to an operation by the processor according to a program such as an operating system (OS) or various control programs stored (installed) in the storage 130. Here, each of the above configurations may be configured by a hardware circuit independently of an operation according to a program by the control unit 100.

The controller 101 controls the entire information processing device 10.

The receiving unit 103 has a function of receiving a signal output from the operation unit 120 and receiving an instruction from the user input using the operation unit 120.

The information processing unit 102 has a function of performing various programs such as document creation software or spreadsheet software stored in the storage 130 in response to an instruction received by the receiving unit 103 and generating or changing (processing) document data or table data.

The display controller 104 has a function of controlling a display operation by the display unit 110 and causing the display unit 110 to display an operation screen or the like indicating an information processing result by the information processing unit 102.

The storage controller 105 has a function of performing storage control of data generated or changed by the information processing unit 102.

Figure 3A:
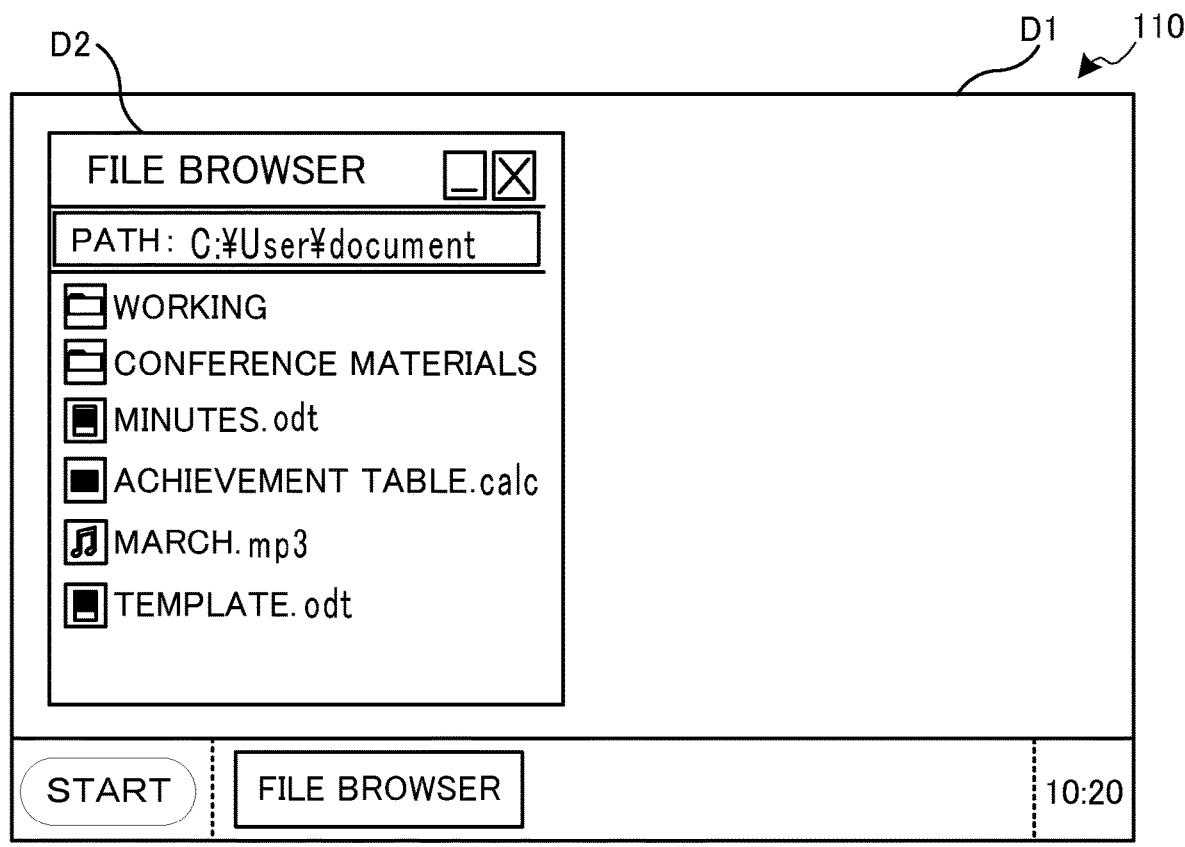
FIGS. 3A and 3B are diagrams illustrating an example of an operation screen displayed on a display unit of the information processing device according to Embodiment 1 of the present disclosure.
Figure 3B:
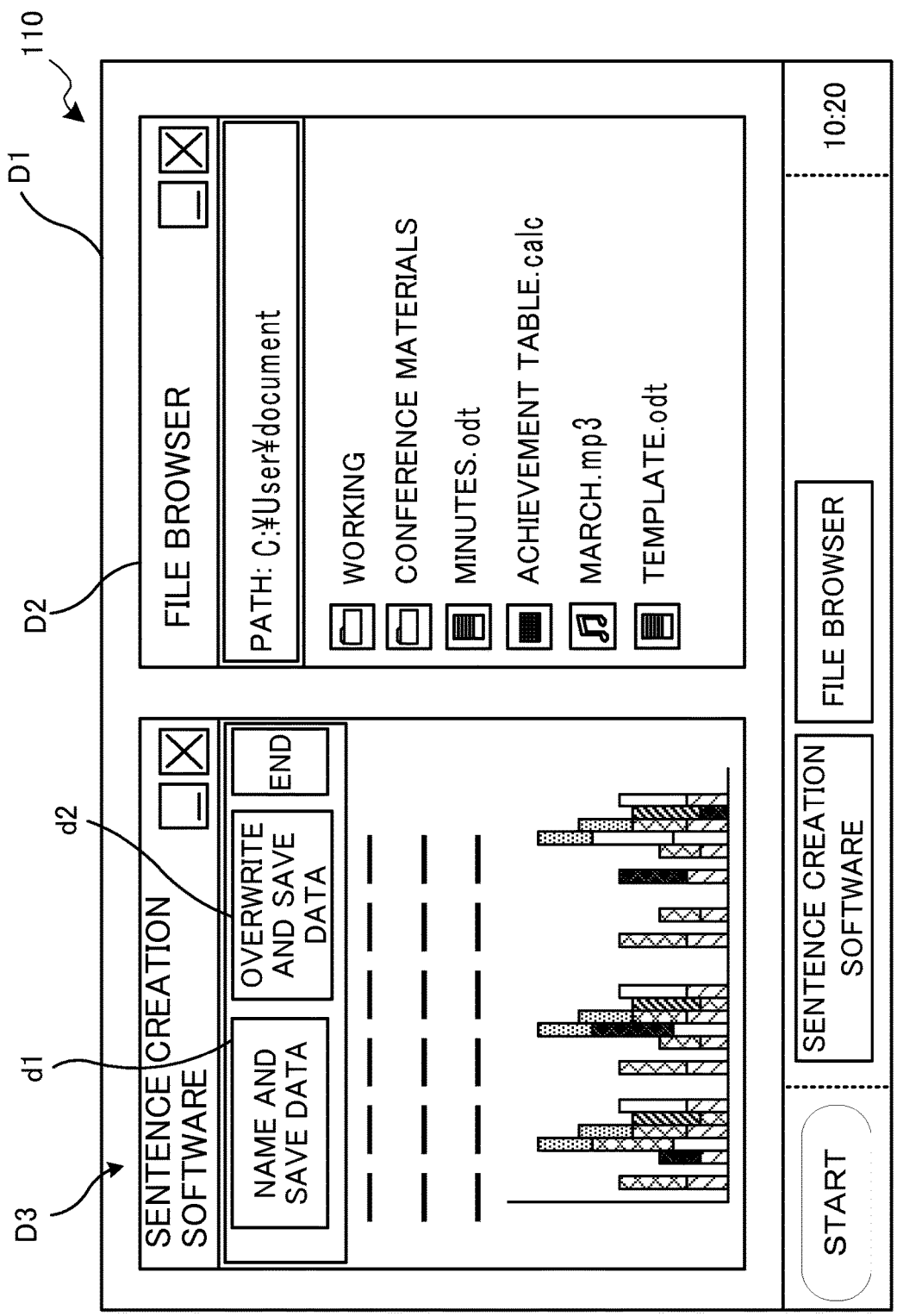

FIGS. 3A and 3B are diagrams illustrating an example of an operation screen displayed on the display unit 110. FIG. 3A illustrates an operation screen displayed on the display unit 110 when file browser software stored in the storage 130 is executed by the information processing unit 102. In the example illustrated in FIGS. 3A and 3B, an operation screen D2 serving as a processing result of the file browser software is displayed on a desktop screen D1. A path indicating a position of a directory in the storage 130 and a plurality of icons associated with a variety of data (files) included in the directory are shown in the operation screen D2.

When the receiving unit 103 receives an operation of selecting an icon shown on the operation screen D2, the information processing unit 102 executes software associated with the selected icon. For example, in the example illustrated in FIG. 3A, when an icon of "minutes.odt" is selected, the information processing unit 102 executes document creation software associated with the icon. An operation screen D3 indicating data shown in "minutes.odt" is displayed on the display unit 110 under control of the display controller 104 (refer to FIG. 3B). Buttons d1 and d2 for receiving a storage (save) instruction of document data created or changed by sentence creation software are arranged on the operation screen D3. The button d1 is a button for receiving an instruction to give a different file name to created or changed document data, designate a save destination of the created or changed document data, and store the created or changed document data, that is, a so-called instruction to "name and save data." Furthermore, the button d2 is a button for receiving an instruction to store changed document data with the same file name and the same save destination, that is, an instruction to "overwrite and save data." The storage controller 105 performs storage control of document data generated or changed by the information processing unit 102 in response to a selection operation for the buttons d1 and d2.

Referring to FIG. 2 again, a configuration of the storage device 20 will be described. The storage device 20 includes a control unit 200, a display unit 210, an operation unit 220, a storage 230, a communication unit 240, and the like. The display unit 210 is constituted of a liquid crystal display, an organic EL display, or the like. The operation unit 220 is an input device such as a mouse, a keyboard, and a touch panel provided in a front face of the display unit 210. The storage 230 is a storage device such as an HDD or a flash memory. The communication unit 240 is a communication interface including a communication module such as a LAN chip.

The control unit 200 is configured to include a processor, a RAM, a ROM, and a dedicated hardware circuit. The control unit 200 functions as a controller 201, a display controller 202, and a storage controller 203 through an operation by the processor according to a program stored in the storage 230. Here, each of the above configurations may be constituted by a hardware circuit independently of the operation by the program according to the control unit 200.

The controller 201 controls the overall operations of the storage device 20. The display controller 202 has a function of controlling a display operation by the display unit 210. The storage controller 203 has a function of controlling a storage operation by the storage 230.

A configuration of the information processing system 1 has been described above. Next, detailed processing content in the information processing system 1 will be described with reference to FIGS. 4 to 6.

Figure 4:
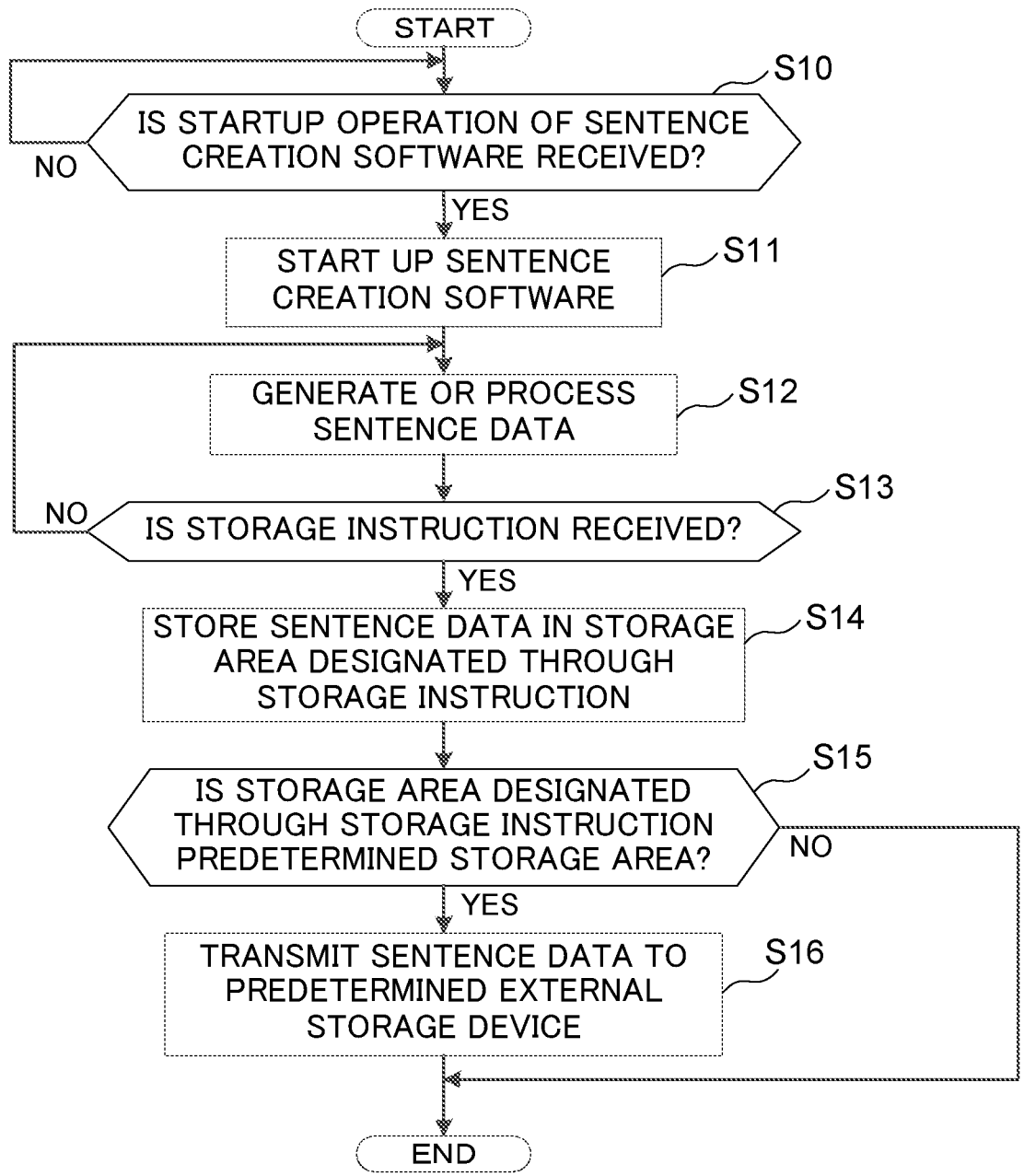
FIG. 4 is a flowchart for describing a flow of an operation by the information processing device according to Embodiment 1 of the present disclosure.

FIG. 4 is a flowchart for describing a flow of an operation by the information processing device 10. A process when document data created or changed by the document creation software is stored will be described with reference to the flowchart.

When the receiving unit 103 receives a startup instruction of sentence creation software (YES in Step S10), the information processing unit 102 starts up the sentence creation software (Step S11) and the receiving unit 103 generates or changes sentence data in response to an instruction from the user (Step S12).

After the process of Step S12, when the receiving unit 103 receives a selection instruction for the button d1 or d2 arranged in the operation screen D3 shown in FIG. 3B, that is, a predetermined storage instruction (YES in Step S13), the storage controller 105 stores document data in a directory (storage area) of the storage 130 designated through a storage instruction (Step S14).

After the process of Step S14, the storage controller 105 determines whether the directory (storage area) designated through the storage instruction is the predetermined storage area (Step S15).

Figure 5:
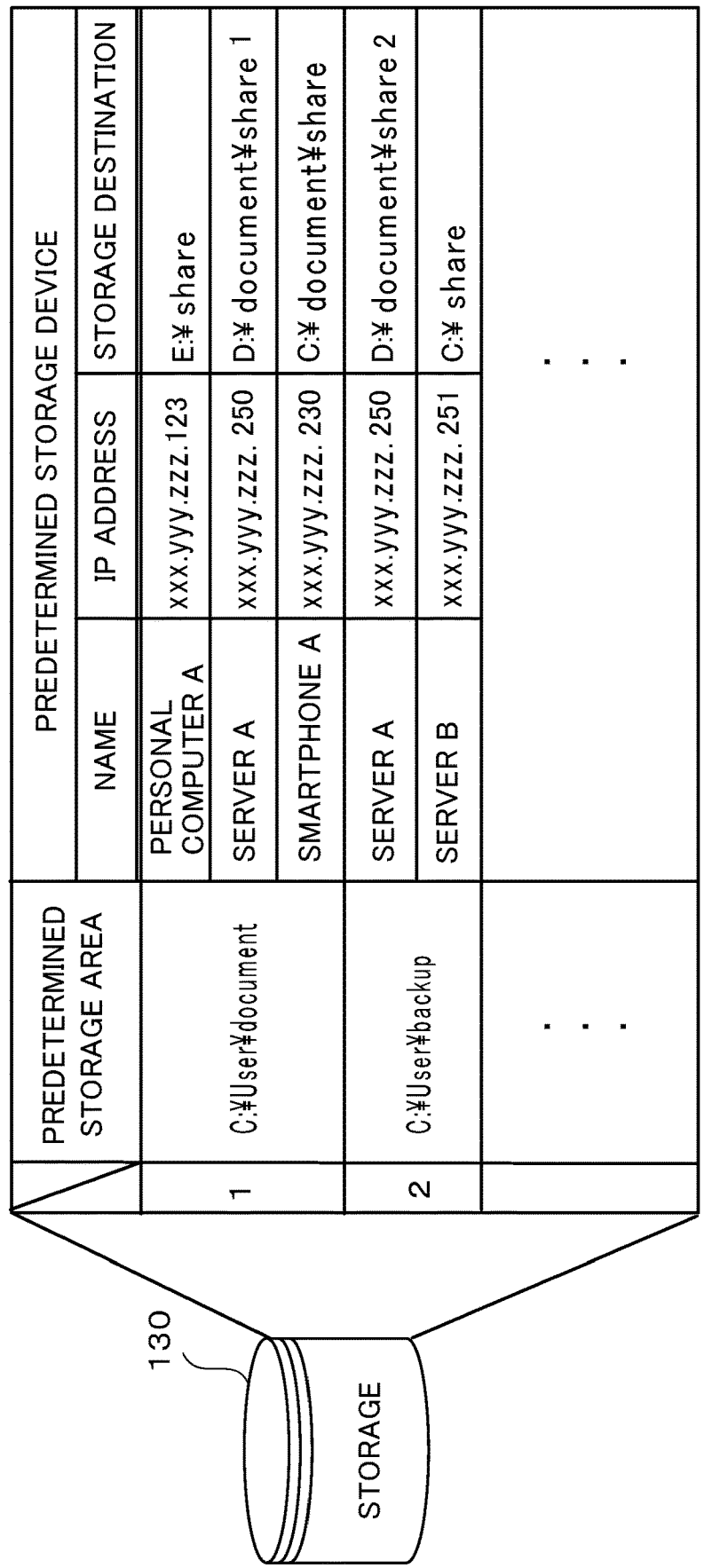
FIG. 5 is a diagram illustrating an example of information stored in a storage of the information processing device according to Embodiment 1 of the present disclosure.

Here, the storage 130 stores information indicating a predetermined storage area of a plurality of storage areas in the storage 130 in advance. FIG. 5 is a diagram illustrating an example of information stored in the storage 130. In the example illustrated in FIG. 5, a storage area located in a path of "C:¥User¥document" and "C:¥User¥backup" is set as a predetermined storage area. The storage controller 105 acquires the information stored in the storage 130 and determines whether a storage area designated by a storage instruction is a predetermined storage area on the basis of the acquired information.

Referring to FIG. 4 again, if it is determined that the storage area designated by the storage instruction is the predetermined storage area (YES in Step S15), the storage controller 105 causes the communication unit 140 to transmit document data that is the same as the document data stored in the storage 130 to a predetermined storage device 20 (Step S16). The storage device 20 which receives document data transmitted from the information processing device 10 stores the document data in the storage 230 under control of the storage controller 203.

Here, the storage 130 stores information indicating a predetermined storage device of a plurality of storage devices 20 connected to the information processing device 10 via the network N in advance. In the example illustrated in FIG. 5, a corresponding predetermined storage device is set for each predetermined storage area. To be specific, a personal computer A, a server A, and a smartphone A are set as predetermined storage devices corresponding to a storage area of "C:¥User¥document" and the server A and a server B are set as predetermined storage devices corresponding to a storage area of "C:¥User¥backup." The storage controller 105 acquires the information stored in the storage 130 and identifies a predetermined storage device configured to transmit document data on the basis of the acquired information.

Also, as illustrated in FIG. 5, the storage 130 stores an internet protocol (IP) address serving as information indicating a position of a predetermined storage device 20 on the network N and information indicating a path representing a storage location of the transmitted document data in the storage 230 of the storage device 20 in advance. The storage controller 105 acquires the information stored in the storage 130 and transmits information for designating a storage location in the storage 230 of the storage device 20 in the process of Step S16 to a predetermined storage device 20 together with document data.

Figure 6:
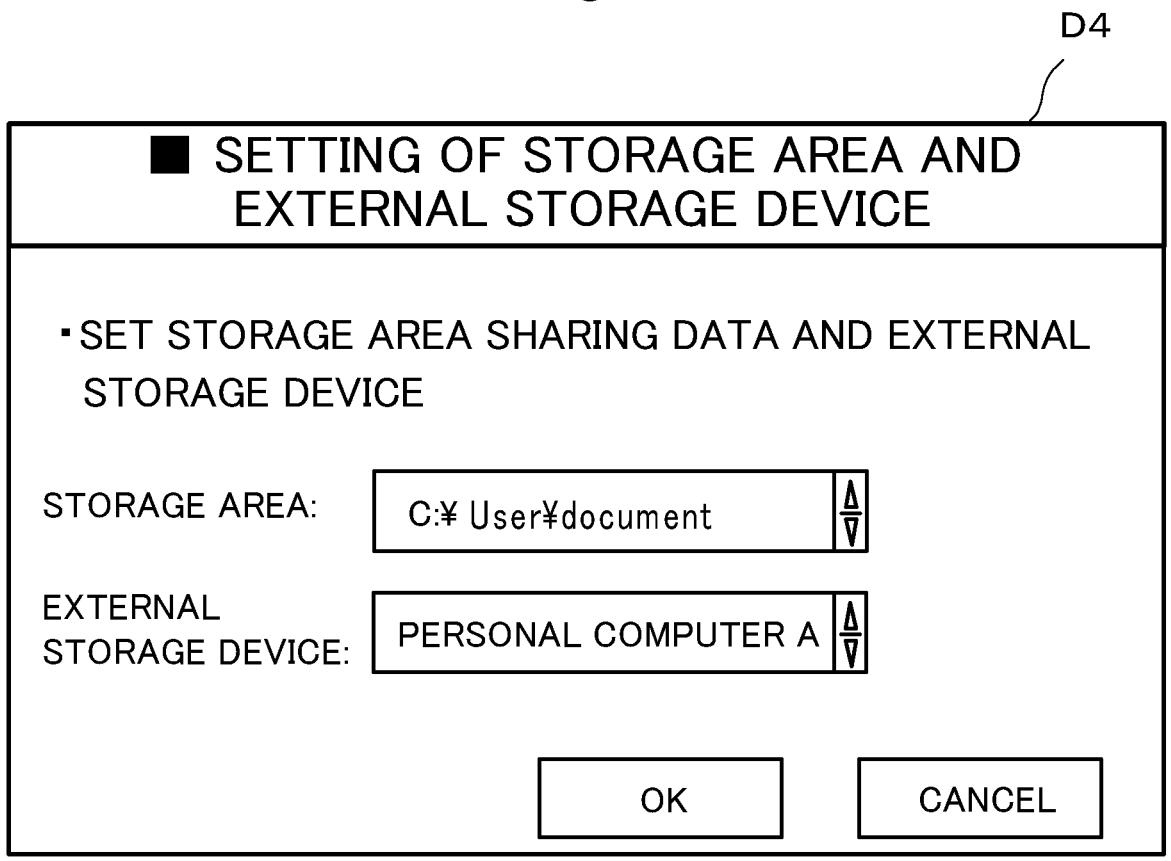
FIG. 6 is a diagram illustrating an example of a reception screen displayed on the display unit of the information processing device according to Embodiment 1 of the present disclosure.

FIG. 6 is a diagram illustrating an example of a reception screen for receiving settings of the predetermined storage area and the predetermined storage device. The storage controller 105 generates information indicating the predetermined storage area and the predetermined storage device illustrated in FIG. 5 on the basis of an instruction received by the receiving unit 103 in a reception screen D4 illustrated in FIG. 6 and stores the generated information in the storage 130. In the example illustrated in FIG. 6, "C:¥User¥document" is set as a predetermined storage area and a "personal computer A" is set as a predetermined storage device 20.

As described above, according to the information processing device 10 and the information processing system 1 related to Embodiment 1 of the present disclosure, once the user has set a predetermined storage area and a predetermined storage device, it is possible to transmit created or changed data to an external storage device 20 and back up data or share information only by performing operations such as creation or change of data by normal sentence creation software or spreadsheet software, especially without user's consciousness.

Embodiment 2

Figure 7:
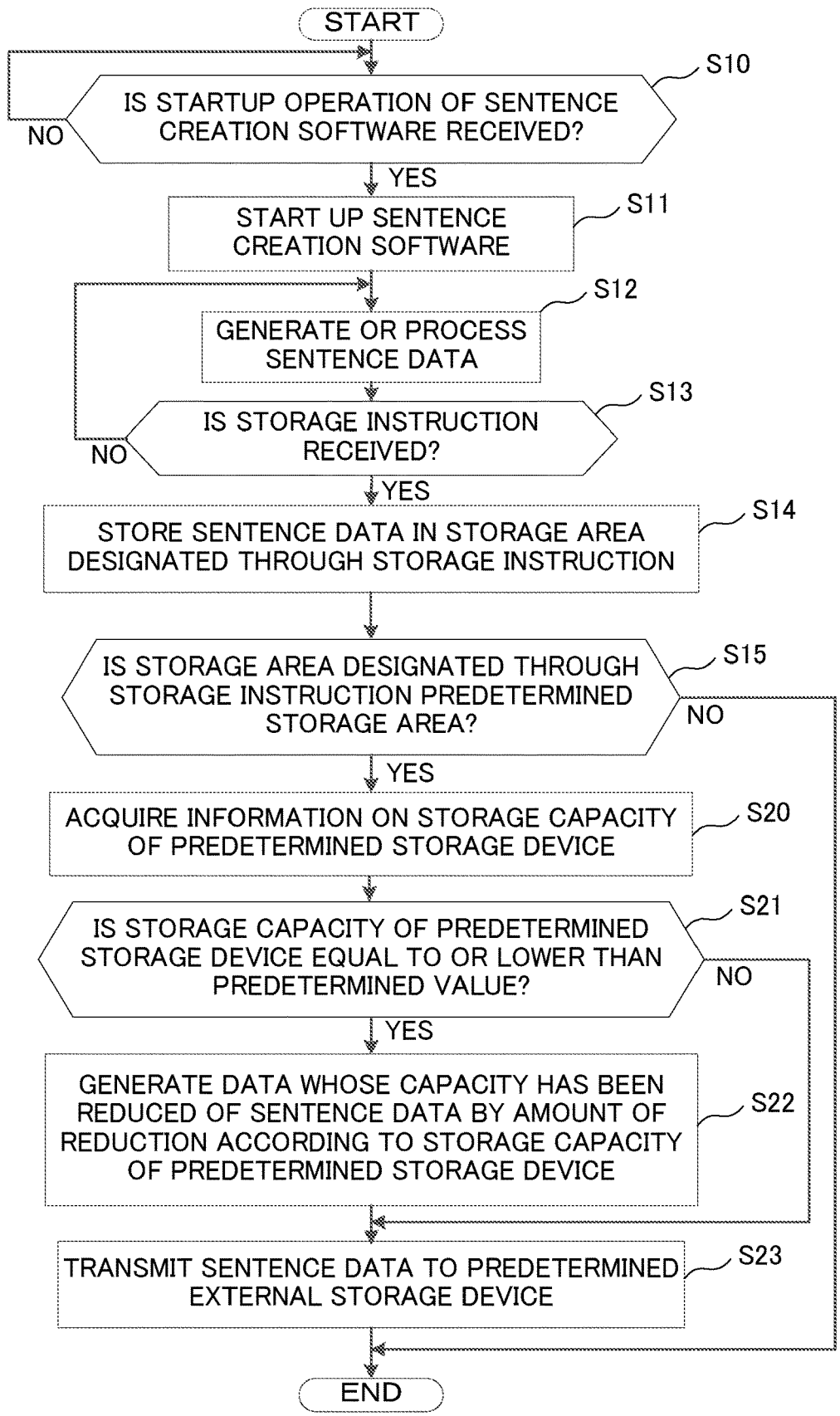
FIG. 7 is a flowchart for describing a flow of an operation by an information processing device according to Embodiment 2 of the present disclosure.

FIG. 7 is a flowchart for describing a flow of an operation by the information processing device 10 according to Embodiment 2. Note that processes with the same contents as the flowchart described with reference to FIG. 4 will be denoted with the same reference numerals and description thereof will be omitted.

If it is determined that a storage area designated through a storage instruction is a predetermined storage area (YES in Step S15), a storage controller 105 causes a communication unit 140 to communicate with a predetermined storage device 20 and acquires information on a storage capacity of the predetermined storage device 20 (Step S20). Moreover, if it is determined that the storage capacity of the predetermined storage device 20 is not equal to or lower than a predetermined threshold value (for example, 20 GB) (NO in Step S21), the communication unit 140 is caused to transmit the same document data as the document data stored in a storage 130 to the predetermined storage device 20 (Step S23) like in the process of Step S16 illustrated in FIG. 4. On the other hand, if it is determined that the storage capacity of the predetermined storage device 20 is equal to or lower than a predetermined threshold value (for example, 20 GB) (YES in Step S21), the storage controller 105 generates data obtained by reducing a capacity of document data in accordance with the storage capacity of the predetermined storage device (Step S22). In such a process, the storage controller 105 increases an amount of reduction (rate of reduction) of a data capacity as the storage capacity of the predetermined storage device is smaller. For example, when a constant of proportionality, a threshold value (for example, 20 GB) of a storage capacity, and a storage capacity of a predetermined storage device are set to A, B, and C, respectively, an amount of reduction L of a data capacity is calculated using a calculation expression of "L=A×(B−C)."

When an image is included in data, the storage controller 105 generates data obtained by reducing a capacity of data obtained by reducing resolution of such an image. Furthermore, when an image is included in data, the storage controller 105 may generate data obtained by reducing a capacity of data obtained by monochromatizing such an image. The storage controller 105 may extract a part of information included in the data to generate data whose capacity has been reduced. For example, when such data is data constituted of a plurality of paragraphs, the storage controller 105 may extract a part of the paragraphs to generate data whose capacity has been reduced. When such data is data including text and an image, the storage controller 105 may extract text or an image to generate data whose capacity has been reduced. When such data is document data, the storage controller 105 may generate text data obtained by extracting text included in such document data to generate data whose capacity has been reduced. The storage controller 105 adjusts an amount of reduction (rate of reduction) of data capacity by adjusting resolution of an image or adjusting the number of images to be monochromatized.

After a process of Step S22, the storage controller 105 controls the communication unit 140 to transmit data whose capacity has been reduced to a predetermined storage device 20 (Step S23).

Note that, when there are a plurality of predetermined storage devices 20, the processes of Step S20 to Step S23 are performed for each predetermined storage device 20. In other words, the storage controller 105 generates data whose capacity has been reduced to an amount of reduction according to a storage capacity of each of a plurality of predetermined storage devices 20 for each of the plurality of predetermined storage devices 20 and controls the communication unit 140 to transmit such generated data to a predetermined storage device 20 corresponding to each data.

As described above, according to the information processing device 10 and the information processing system 1 related to Embodiment 2 of the present disclosure, it is possible to prevent such a storage capacity from being burdened more than necessary by transmitting data whose capacity has been reduced to a predetermined storage device 20 with a small storage capacity.

Note that, in the process of Step S22, the storage controller 105 may generate data obtained by reducing a capacity of document data in accordance with an available capacity of the predetermined storage device in addition to a storage capacity of a predetermined storage device. In this case, in the process of Step S20, the storage controller 105 causes the communication unit 140 to communicate with a predetermined storage device 20 and acquires information on an available capacity in addition to information on a storage capacity of the predetermined storage device 20.

In the process of Step S22, the storage controller 105 increases an amount of reduction (rate of reduction) of a data capacity as a storage capacity and an available capacity of a predetermined storage device is smaller. For example, when a constant of proportionality, a threshold value (for example, 20 GB) of a storage capacity, a storage capacity of a predetermined storage device, a threshold value (for example, 5 GB) of an available capacity, and an available capacity of the predetermined storage device are set to A, B, C, D, and E, respectively, an amount of reduction L of a data capacity is calculated using a calculation expression of "L=A×(B−C)×(D−E)."

Also, if it is determined that the storage capacity of the predetermined storage device 20 is not equal to or lower than a predetermined threshold value (for example, 20 GB) (NO in Step S21) and an available capacity of the predetermined storage device 20 is not equal to or lower than a predetermined threshold value (for example, 5 GB), the storage controller 105 may cause the communication unit 140 to transmit the same document data as the document data stored in the storage 130 to the predetermined storage device 20. In this case, if it is determined that the storage capacity of the predetermined storage device 20 is equal to or lower than a predetermined threshold value (for example, 20 GB) (YES in Step S21) or an available capacity of the predetermined storage device 20 is equal to or lower than a predetermined threshold value (for example, 5 GB), the storage controller 105 generates data obtained by reducing a capacity of the document data.

Embodiment 3

Figure 8:
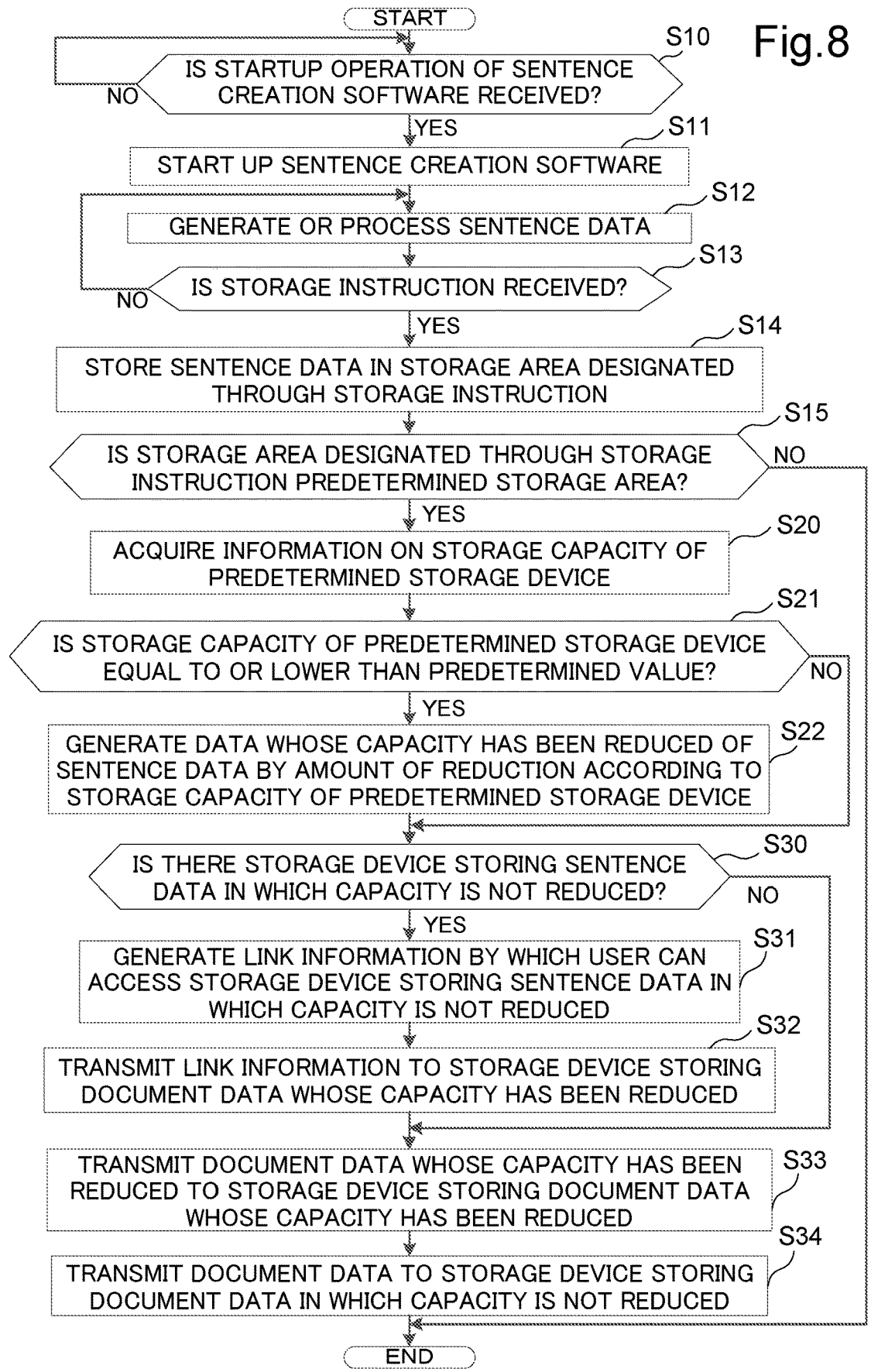
FIG. 8 is a flowchart for describing a flow of an operation by an information processing device according to Embodiment 3 of the present disclosure.

FIG. 8 is a flowchart for describing a flow of an operation by the information processing device 10 according to Embodiment 3. Note that processes with the same contents as the flowcharts described with reference to FIGS. 4 and 7 will be denoted with the same reference numerals and description thereof will be omitted.

After the process of Step S22, that is, after a storage controller 105 generates data obtained by reducing a capacity of document data in accordance with a storage capacity of a predetermined storage device 20, the storage controller 105 identifies whether there is a storage device storing document data in which a capacity of data is not reduced among a plurality of predetermined storage devices 20 (Step S30). In the process of Step S30, data whose capacity has been reduced is transmitted to a part of a plurality of predetermined storage devices 20 and determines whether to transmit document data in which a capacity of data is not reduced to a part of the plurality of predetermined storage devices 20.

If it is determined that there is a storage device storing document data in which a capacity of data is not reduced among the plurality of predetermined storage devices 20 (YES in Step S30), the storage controller 105 generates link information by which the user can access the storage device 20 storing document data in which a capacity is not reduced (Step S31). Here, link information is information by which, for example, a location of a storage device 20 on the network N such as a shortcut or a hyperlink including a uniform resource locator (URL) indicating the location of the storage device 20 can be identified.

After a process of Step S31, the storage controller 105 controls the communication unit 140 to transmit such generated link information and document data whose capacity has been reduced to a storage device 20 storing document data whose capacity has been reduced (Steps S32 and S33). The user can easily access the original data in the storage device 20 storing data whose capacity has been reduced by transmitting link information by which the user can access a storage device 20 storing the original data whose capacity is not reduced. Note that the storage controller 105 causes the communication unit 140 to transmit the same document data as the document data stored in the storage 130 to a storage device 20 storing document data whose capacity is not reduced (Step S34).

On the other hand, if it is determined that there is no a storage device storing document data in which a capacity of data has not been reduced among a plurality of predetermined storage devices 20 (NO in Step S30), the storage controller 105 controls the communication unit 140 to transmit only document data whose capacity has been reduced to a storage device 20 storing document data whose capacity has been reduced (Step S33).

As described above, according to the information processing device 10 and the information processing system 1 related to Embodiment 3 of the present disclosure, it is possible to prevent such a storage capacity from being burdened by transmitting data whose capacity has been reduced to a predetermined storage device 20 with a small storage capacity, and the user can easily access the original data on the storage device 20 storing data whose capacity has been reduced.

<Supplement 1>

Note that a storage controller 105 may receive a signal indicating completion of storage transmitted from a storage device 20 via a communication unit 140 when data has been stored in a storage device 20. In this case, the storage controller 105 receives the signal transmitted from the storage device 20 storing data whose capacity is not reduced and then transmits link information to the communication unit 140. Thus, it is possible to prevent situations in which the user accesses a link destination using the link information in a state in which storage of data is not completed at the link destination.

<Supplement 2>

When a storage device 20 storing data whose capacity is not reduced cannot be identified in a process of Step S30, a storage controller 105 may determines whether the data is data whose capacity has not been reduced by combining data whose capacities have been reduced stored in a plurality of storage devices among a plurality of predetermined storage devices 20. For example, when there are a storage device A storing text of paragraphs 1 to 20, a storage device B storing text of paragraphs 21 to 40, and a storage device C storing an image in data constituted of text and images of paragraphs 1 to 40, data whose capacities have not been reduced (data constituted of text and images of paragraphs 1 to 40) can be constituted by combining data stored in the storage devices A to C. In this case, the storage controller 105 identifies the storage devices A to C.

Moreover, if it is determined that data are data whose capacities have not been reduced by combining such data whose capacities have been reduced, the storage controller 105 generates pieces of link information by which the user can access a plurality of storage devices storing data whose capacities have been reduced. After that, the storage controller 105 controls the communication unit 140 to transmit the generated link information and the document data whose capacities have been reduced to a predetermined storage device 20. In the case of the above example, the storage controller 105 transmits three pieces of link information by which the user can access the storage devices A to C and the document whose capacities have been reduced to the predetermined storage device 20.

Note that, when storage of data in the storage device 20 has been completed, the storage controller 105 may perform the following processes in a case in which the storage controller 105 receives signals indicating completion of storage transmitted from the storage device 20 via the communication unit 140. In other words, the storage controller 105 receives all of the signals transmitted from a plurality of storage devices 20 storing data whose capacities have been reduced and then causes the communication unit 140 to transmit pieces of link information. Thus, it is possible to prevent situations in which the user accesses a link destination using the link information in a state in which storage of data is not completed at the link destination.

Embodiment 4

In an information processing device 10 according to Embodiment 4, data to be processed by an information processing unit 102 is data constituted of a plurality of sheets such as table data generated or changed using spreadsheet software.

Figure 9:
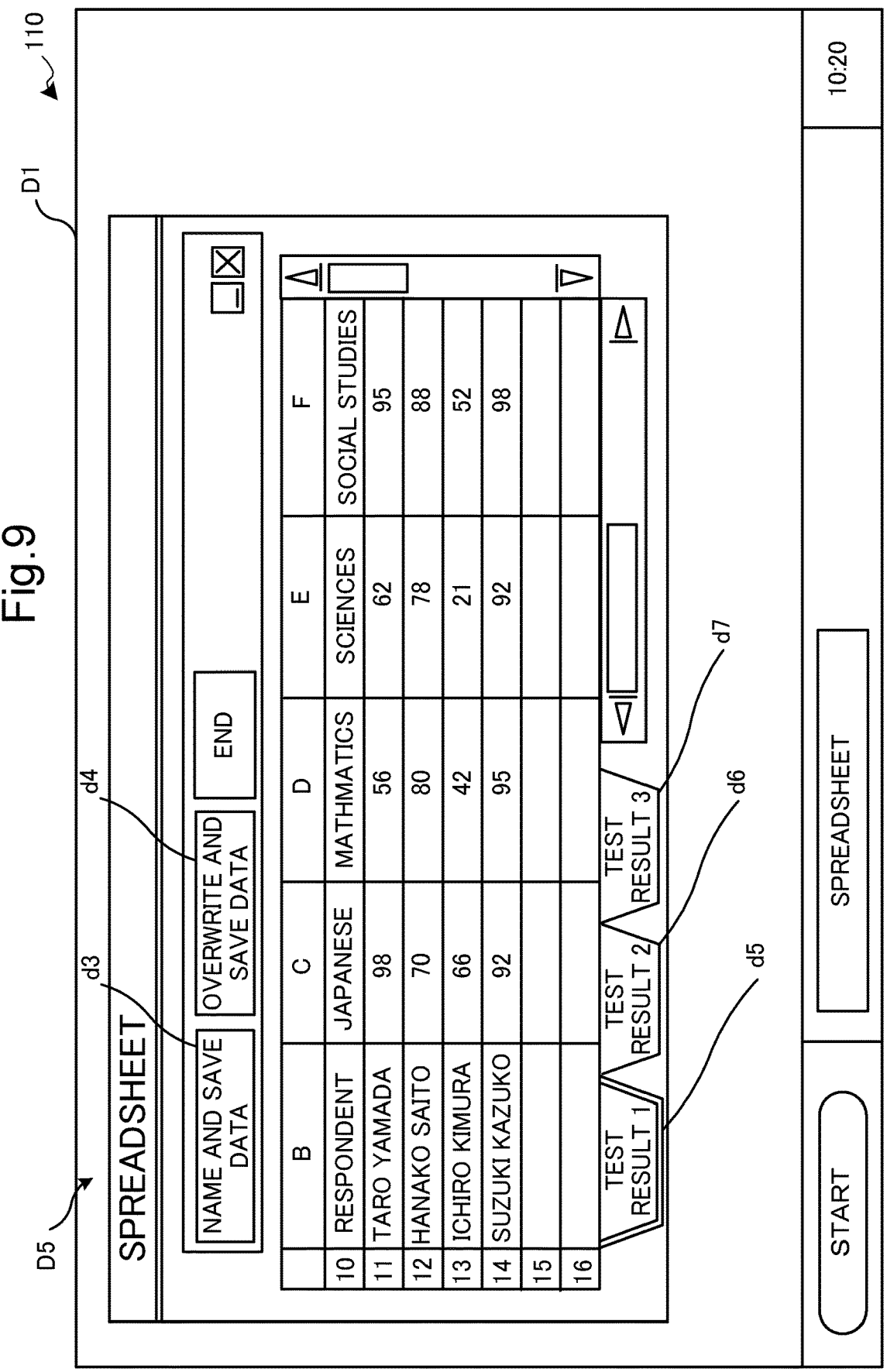
FIG. 9 is a diagram illustrating an example of an operation screen displayed on a display unit of an information processing device according to Embodiment 4 of the present disclosure.

FIG. 9 illustrates an operation screen displayed on a display unit 110 when spreadsheet software stored in a storage 130 is executed by the information processing unit 102. In an example illustrated in FIG. 9, an operation screen D5 serving as a processing result of spreadsheet software is displayed on a desktop screen D1. Buttons d3 and d4 for receiving an instruction to store (save) table data created or changed using spreadsheet software are arranged in the operation screen D5. The storage controller 105 performs storage control for the table data generated or changed by the information processing unit 102 in response to a selection operation for the buttons d3 and d4.

Also, table data constituted of three sheets is illustrated in the example illustrated in FIG. 9. The sheets constituting the table data are associated with tabs d5, d6, and d7 arranged in the operation screen D5. In FIG. 9, one sheet associated with the tab d5 is displayed. When the receiving unit 103 receives a selection operation for each tab, data displayed on the operation screen D5 is changed to data of a sheet associated with the selected tab under control of the display controller 104.

Figure 10:
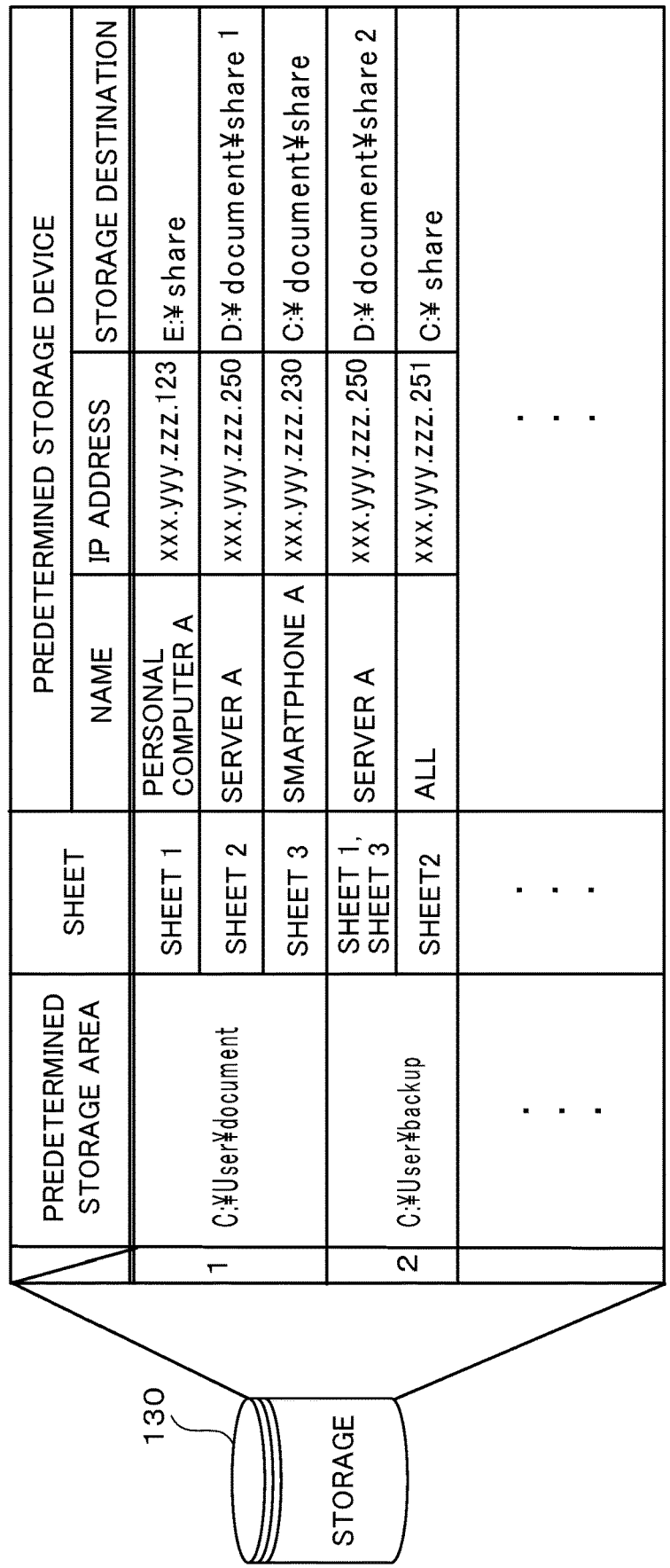
FIG. 10 is a diagram illustrating an example of data stored in advance in a storage of the information processing device according to Embodiment 4 of the present disclosure.

FIG. 10 is a diagram illustrating an example of data stored in the storage 130 in advance. In the information processing device 10 according to Embodiment 4, sheets constituting table data are associated with predetermined storage devices 20. In addition, as illustrated in FIG. 10, information indicating a correspondence between a plurality of sheets and the predetermined storage devices 20 is stored in the storage 130 in advance.

In the example illustrated in FIG. 10, with regard to a predetermined storage area of "C:¥User¥document," a "personal computer A" serving as a predetermined storage device, a "server A" serving as a predetermined storage device, and a "smartphone A" serving as a predetermined storage device correspond to a sheet 1, a sheet 2, and a sheet 3, respectively. Furthermore, with a predetermined storage area of "C¥User¥backup," the "server A" serving as a predetermined storage device and all of the storage devices 20 connected to the network N are associated with the sheet 1 and the sheet 3, and the sheet 2, respectively.

Figure 11:
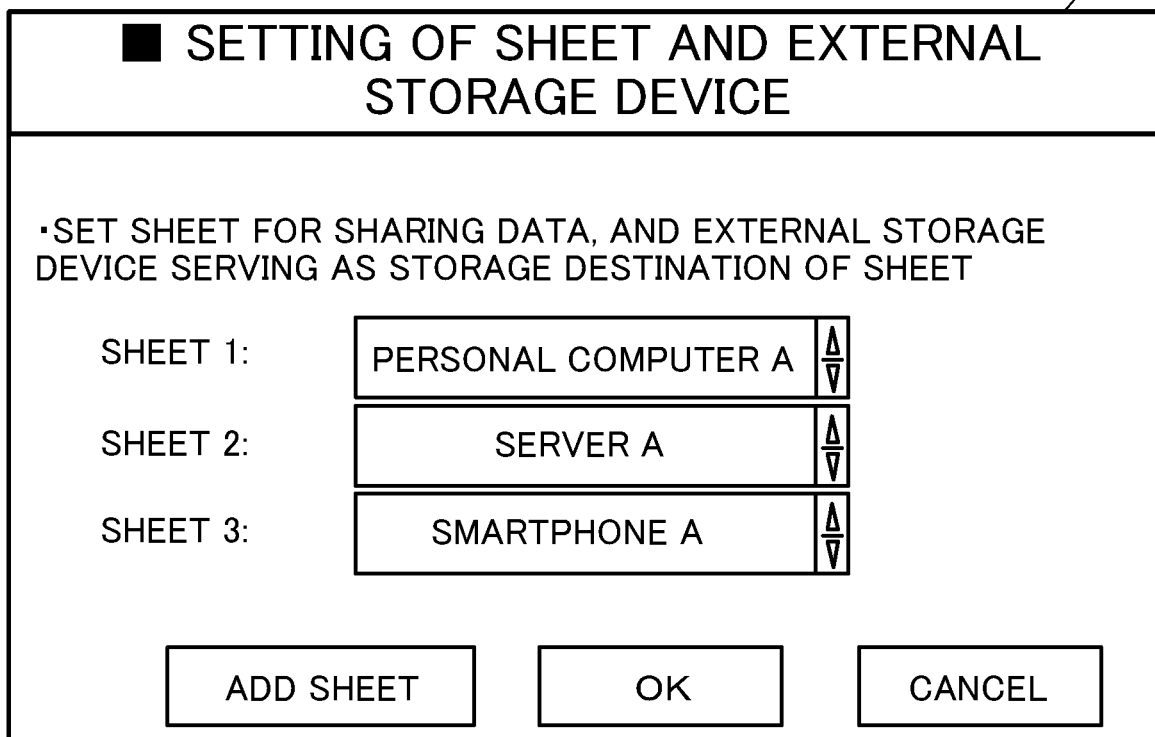
FIG. 11 is a diagram illustrating an example of a reception screen displayed on the display unit of the information processing device according to Embodiment 4 of the present disclosure.

FIG. 11 is a diagram illustrating an example of a reception screen for receiving a setting of information indicating the correspondence between the plurality of sheets and the predetermined storage devices 20. The storage controller 105 generates information indicating a correspondence between a plurality of sheets and predetermined storage devices 20 illustrated in FIG. 10 and stores such generated information in the storage 130 on the basis of an instruction received by the receiving unit 103 in a reception screen D6 illustrated in FIG. 11. In the example illustrated in FIG. 11, a "personal computer A" serving as a predetermined storage device, a "server A" serving as a predetermined storage device, and a "smartphone A" serving as a predetermined storage device correspond to a sheet 1, a sheet 2, and a sheet 3, respectively.

Figure 12:
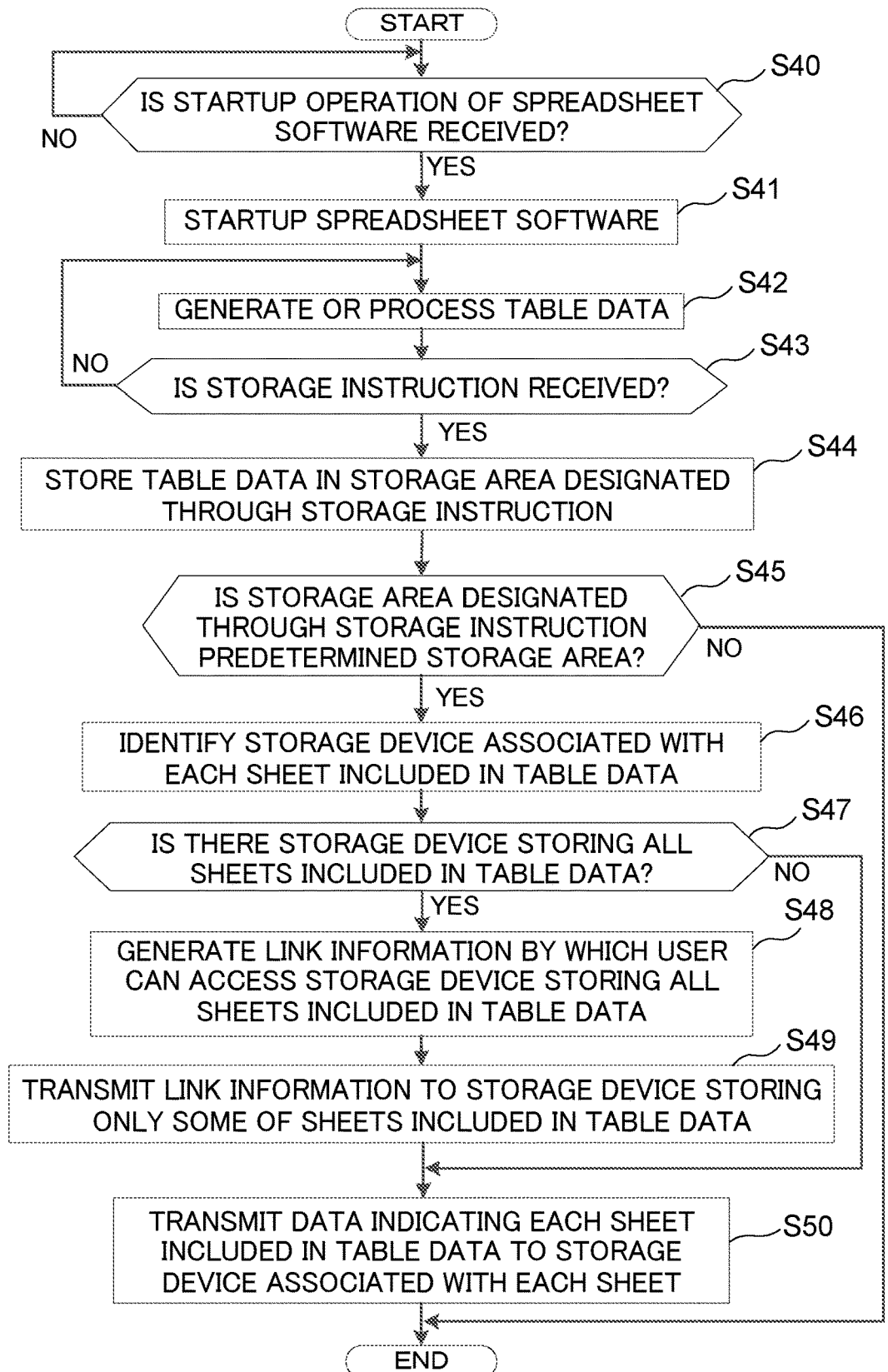
FIG. 12 is a flowchart for describing a flow of an operation by the information processing device according to Embodiment 4 of the present disclosure.

In the information processing device 10 according to Embodiment 4, control is performed so that data is stored in an external storage device 20 on the basis of information indicating the correspondence between the plurality of sheets and the predetermined storage devices 20. FIG. 12 is a flowchart for describing a flow of such control.

If it is determined that the receiving unit 103 receives a startup instruction for spreadsheet software (YES in Step S40), the information processing unit 102 starts up the spreadsheet software (Step S41) and the receiving unit 103 generates or changes table data in response to an instruction from the user (Step S42).

After the process of Step S42, if it is determined that a selection instruction for the button d3 or d4 arranged in the operation screen D5 illustrated in FIG. 9, that is, a predetermined storage instruction is received by the receiving unit 103 (YES in Step S43), the storage controller 105 stores such table data in a directory (storage area) of the storage 130 designated through the storage instruction (Step S44).

After the process of Step S44, the storage controller 105 determines whether the directory (storage area) designated through the storage instruction is a predetermined storage area stored in the storage 130 (Step S45). If it is determined that the storage area designated through the storage instruction is the predetermined storage area (YES in Step S45), information indicating a correspondence between a plurality of sheets and predetermined storage devices 20 stored in the storage 130 is acquired and a storage device 20 corresponding to each sheet included in the table data is identified on the basis of such acquired information (Step S46).

After the process of Step S46, the storage controller 105 determines whether there is a storage device 20 for storing all sheets included in the table data (Step S47). If it is determined that there is no storage device 20 for storing all the sheets included in the table data (NO in Step S47), the storage controller 105 controls the communication unit 140 to transmit data indicating each sheet included in the table data to a storage device 20 corresponding to each sheet (Step S50). In the example illustrated in FIG. 10, the storage controller 105 transmits data indicating the sheet 1, data indicating the sheet 2, and data indicating the sheet 3 to the personal computer A, the server A, and the smartphone A, respectively.

On the other hand, if it is determined that there is the storage device 20 for storing all the sheets included in the table data (YES in Step S47), the storage controller 105 performs the processes of Steps S48 and S49. Here, a case in which there is a storage device 20 for storing all sheets included in a table data refers to a case in which there is a storage device 20 corresponding to all sheets (sheet 1 to sheet 3).

In the process of Step S48, the storage controller 105 generates link information by which the user can access a storage device 20 associated with all sheets. Moreover, in the process of Step S49, the storage controller 105 controls the communication unit 140 to transmit such generated link information to a storage device 20 for storing only some of the sheets included in the table data (Step S49). After the process of Step S49, the above-described process of Step S50 is performed. The above link information is stored in the storage device 20 associated with only some of the sheets included in the table data through the processes of Steps S49 and S50 in addition to information indicating such some of the sheets. Thus, the user can easily access the original table data in the storage device 20 for storing only some of the sheets included in the table data.

As described above, according to the information processing device 10 and the information processing system 1 related to Embodiment 4 of the present disclosure, once the user has set a correspondence between a plurality of sheets included in table data and predetermined storage devices 20, it is possible to transmit only a desired sheet to an external storage device 20 and back up data or share information only by performing operations such as creation or change of data by spreadsheet software, especially without user's consciousness.

However, generally, for table data or the like constituted of a plurality of sheets, there are cases in which it is desired to back up or share information of the table data in its entirety as well as cases in which it is desired to back up or share information of some sheets of the table data. Furthermore, there are cases in which external storage devices in which data is desired to be stored are different for each sheet of table data.

With respect to a desired sheet among data such as table data constituted of a plurality of sheets, the present embodiment can back up on external storage devices, or share information with the external storage devices.

Note that a case in which the processes of Steps S46 to S50 are performed for all the sheets included in the table data has been described with reference to the flowchart illustrated in FIG. 12. However, the present disclosure is not necessarily limited to such a case. When the entire table data is not changed but only data of some sheets has been changed, the storage controller 105 may not perform the processes of Steps S46 to S50 for all the sheets included in the table data but may perform the processes of Steps S46 to S50 only for such a changed sheet. In other words, when the information processing unit 102 changes only some of the sheets of the table data, the storage controller 105 causes the communication unit 140 to transmit data indicating such a changed sheet to only to a storage device 20 associated with such a changed sheet.

<Supplement 1>

A plurality of sheets constituting table data are constituted of a plurality of areas in some cases. Moreover, area information defining such a plurality of areas is stored in a storage 130 in advance. For example, a sheet of 10 rows and 10 columns can be constituted of four areas, that is, (1) a first area of first to fifth rows and first to fifth columns, (2) a second area of sixth to tenth rows and first to fifth columns, (3) a third area of first to fifth rows and sixth to tenth columns, and (4) a fourth area of sixth to tenth rows and sixth to tenth columns.

Here, a plurality of areas constituting a sheet are associated with predetermined storage devices among a plurality of storage devices 20 and information indicating a correspondence between such a plurality of areas and the predetermined storage devices 20 may be stored in the storage 130 in advance.

Under such a configuration, when the receiving unit 103 receives a predetermined storage instruction for one sheet included in table data, the storage controller 105 stores such table data in the storage 130 and performs the following processes. In other words, the storage controller 105 causes the communication unit 140 to transmit data indicating such an area to a storage device 20 associated with such an area for each of a plurality of areas constituting one sheet and stores the data transmitted to such a storage device 20.

According to the above configuration, once the user has set positions (area information) of a plurality of areas constituting sheets of table data and set a correspondence between the plurality of areas and predetermined storage devices 20, it is possible to transmit only a desired area in the sheet to an external storage device 20 and back up data or share information only by performing operations such as creation or change of sheet by spreadsheet software, especially without user's consciousness.

<Supplement 2>

Note that, when storage of data in the storage device 20 has been completed, the storage controller 105 may receive a signal indicating completion of storage transmitted from the storage device 20 via the communication unit 140. In this case, the storage controller 105 receives the signal transmitted from the storage device 20 storing data indicating all sheets and then causes the communication unit 140 to transmit link information. Thus, it is possible to prevent situations in which the user accesses a link destination using the link information in a state in which storage of data is not completed at the link destination.

<Supplement 3>

When a storage device 20 storing data indicating all sheets cannot be identified in the process of Step S47, the storage controller 105 may combine sheets stored in a plurality of storage devices among a plurality of predetermined storage devices 20 and determine whether the combination is data indicating all sheets. For example, when there are a storage device A storing a sheet 1, a storage device B storing a sheet 2, and a storage device C storing a sheet 3 with respect to data constituted of the sheets 1 to 3, table data indicating all sheets can be constituted by combining data stored in the storage devices A to C. In this case, the storage controller 105 identifies the storage devices A to C.

Moreover, when it is determined that sheets are combined so that the combination is data indicating all sheets, the storage controller 105 generates link information by which the user can access each of a plurality of storage devices storing such data indicating the sheets. After that, the storage controller 105 controls the communication unit 140 to transmit such generated link information to a predetermined storage device 20. In the case of the above example, the storage controller 105 may transmit three pieces of link information by which the user can access each of the storage devices A to C to predetermined storage devices 20.

Note that, when storage of data in the storage device 20 has been completed, the storage controller 105 may perform the following processes when the storage controller 105 receives a signal indicating completion of storage transmitted from the storage device 20 via the communication unit 140. In other words, the storage controller 105 receives all of the signals transmitted from the plurality of storage devices 20 storing the data indicating the sheets and then causes the communication unit 140 to transmit link information. Thus, it is possible to prevent situations in which the user accesses a link destination using the link information in a state in which storage of data is not completed at the link destination.

Embodiment 5

Figure 13:
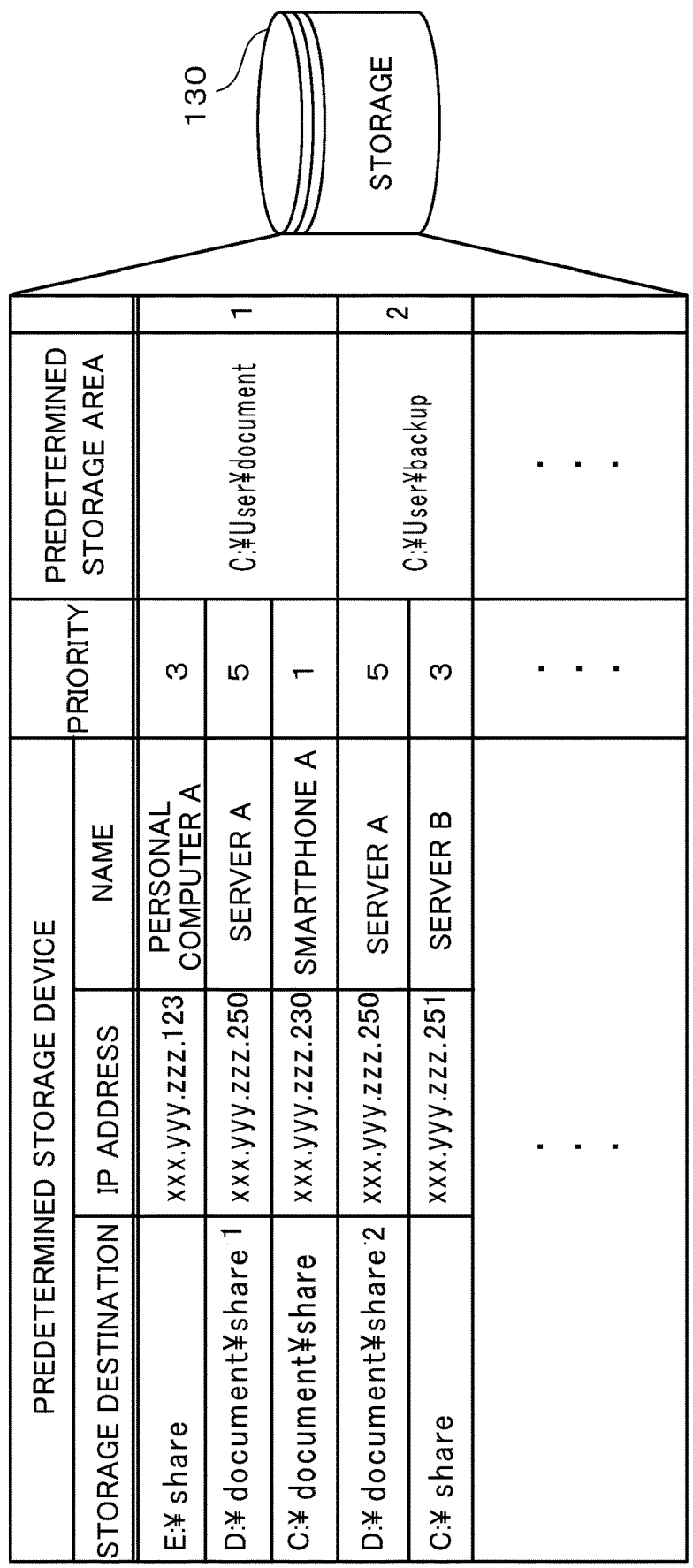
FIG. 13 is a diagram illustrating an example of data stored in advance in a storage of an information processing device according to Embodiment 5 of the present disclosure.

In an information processing device 10 according to Embodiment 5, information indicating a plurality of predetermined storage devices 20 among a plurality of storage devices 20 connected to the information processing device 10 via a network N and information indicating priorities concerning storage destinations of such a plurality of predetermined storage devices 20 are stored in a storage 130. FIG. 13 is a diagram illustrating an example of data stored in the storage 130 in advance. In the example illustrated in FIG. 13, servers A and B are set as predetermined storage devices corresponding to predetermined storage areas of "C:¥User¥backup." Moreover, "5" and "3" are set as priorities for the servers A and B, respectively. A higher priority value refers to a higher priority concerning a storage destination of the storage device 20.

Figure 14:
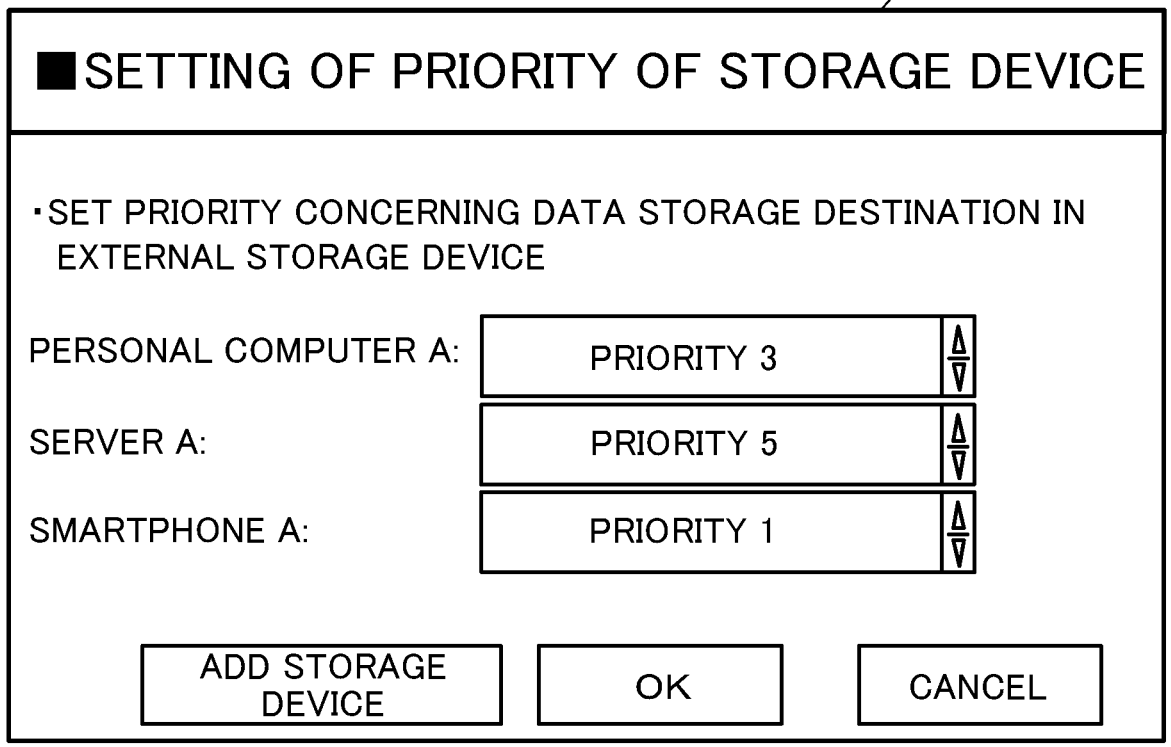
FIG. 14 is a diagram illustrating an example of a reception screen displayed on a display unit of the information processing device according to Embodiment 5 of the present disclosure.

FIG. 14 is a diagram illustrating an example of a reception screen for receiving a setting of the priority. A storage controller 105 generates information indicating the priority illustrated in FIG. 13 on the basis of an instruction received by a receiving unit 103 in a reception screen D7 illustrated in FIG. 14 and stores such generated information in the storage 130. In the example illustrated in FIG. 14, "3," "5,"

and "1" are set as a priority of a personal computer A, a priority of a server A, and a priority of a smartphone A, respectively.

Figure 15:
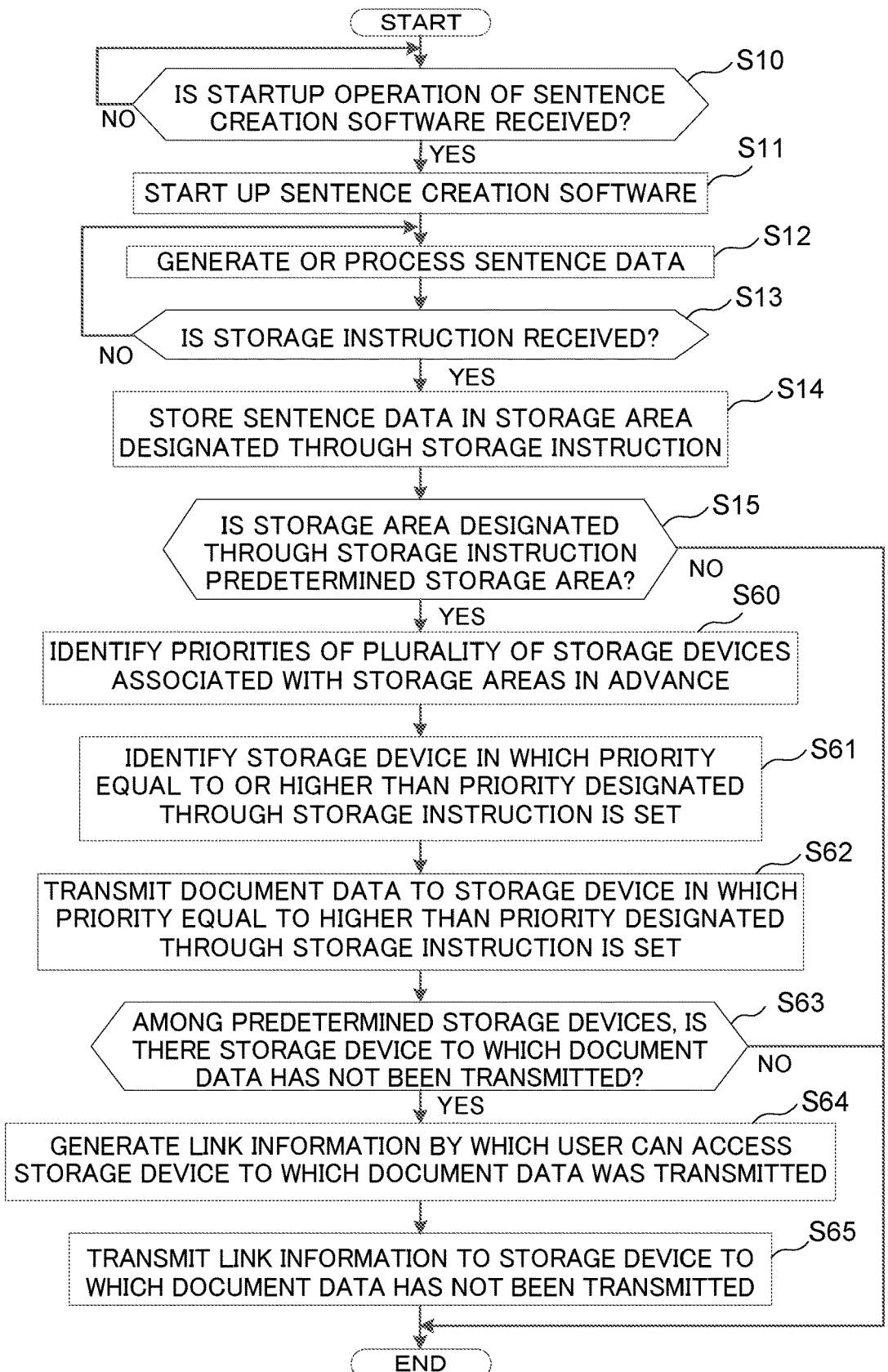
FIG. 15 is a flowchart for describing a flow of an operation by the information processing device according to Embodiment 5 of the present disclosure.

In the information processing device 10 according to Embodiment 5, control is performed so that data is stored in an external storage device 20 on the basis of information indicating such a priority. FIG. 15 is a flowchart for describing a flow of such control. Note that processes with the same contents as the flowchart described with reference to FIG. 4 will be denoted with the same reference numerals and description thereof will be omitted.

If it is determined that a storage area designated through a storage instruction is a predetermined storage area (YES in Step S15), the storage controller 105 acquires information stored in the storage 130 in advance and identifies priorities of a plurality of storage devices associated with the storage area in advance on the basis of such information (Step S60). Moreover, the storage controller 105 identifies a storage device in which a priority equal to or higher than a priority designated through the storage instruction received by the receiving unit 103 in the process of Step S13 is set (Step S61). Here, the storage controller 105 determines a priority designated through a storage instruction on the basis of the number of times selected using a button configured to receive a storage instruction arranged in an operation screen of a display unit 110 in the storage instruction received by the receiving unit 103.

For example, when a button d1 or d2 configured to receive a storage instruction is selected three times in the operation screen D3 illustrated in FIG. 3B, the storage controller 105 identifies that a priority of "3" is designated in the storage instruction. Furthermore, when an input field in which a priority can be input is provided in an operation screen, the storage controller 105 determines a priority designated through the storage instruction on the basis of a numerical value input in such an input field when the storage instruction is performed.

Referring to FIG. 15 again, after the process of Step S61, the storage controller 105 controls a communication unit 140 to transmit document data to a storage device 20 in which a priority equal to or higher than a priority designated through a storage instruction is set (Step S62). For example, when a priority of "3" is set in the storage instruction in the process of Step S13, in the process of Step S62, the document data is transmitted to a personal computer A and a server A in which the priority equal to or higher than the priority of "3" is set.

After the process of Step S62, the storage controller 105 determines whether there is a storage device 20 which does not transmit document data among predetermined storage devices 20 (Step S63). In the process of Step S63, it is determined whether there is a storage device in which a priority lower than the priority set through the storage instruction in the process of Step S13 is set using data stored in the storage 130.

If it is determined that there is a storage device 20 which does not transmit document data among predetermined storage devices 20 (YES in Step S63), the storage controller 105 generates link information by which the user can access the storage device 20 to which the document data has been transmitted (Step S64) and transmits such generated link information to the storage device 20 to which the document data has not been transmitted (Step S65). For example, when it is determined that a priority of "3" in the storage instruction in the process of Step S13 is set, in the process of Step S65, link information by which the user can access a personal computer A and a server A in which a priority equal to or higher than the priority of "3" is set is transmitted to a smartphone A in which a priority lower than the priority of "3" is set. Thus, the user can easily access the storage device 20 in which document data is stored and browses the document data even in the storage device 20 which is low in priority and in which document data is not transmitted.

As described above, according to the information processing device 10 and the information processing system 1 related to Embodiment 5 of the present disclosure, a priority is set when the user gives an instruction to store document data created or changed by document creation software so that the number of external storage devices 20 transmitting document data can be changed. Thus, it is possible to differentiate targets of a storage device 20 for backing up data and sharing information depending on an importance or the like of created or changed sentence data.

<Supplement>

Although a case in which an information processing unit 102 performs a process of determining priorities concerning storage destinations of a plurality of predetermined storage devices 20 on the basis of an instruction received by a receiving unit 103 has been described in the embodiment, the present disclosure is not necessarily limited to such a case.

In the information processing device 10 according to Supplement, the information processing unit 102 controls a communication unit 140 to acquire information indicating an available capacity of a predetermined storage device 20 from the predetermined storage devices 20. Moreover, the information processing unit 102 determines priorities concerning storage destinations of a plurality of predetermined storage devices 20 in accordance with an available capacity of a predetermined storage device 20. To be specific, the information processing unit 102 sets a higher priority as an available capacity of the storage device 20 is larger. Furthermore, the information processing unit 102 stores information indicating a priority determined by the above process in a storage 130.

Embodiment 6

Figure 16:
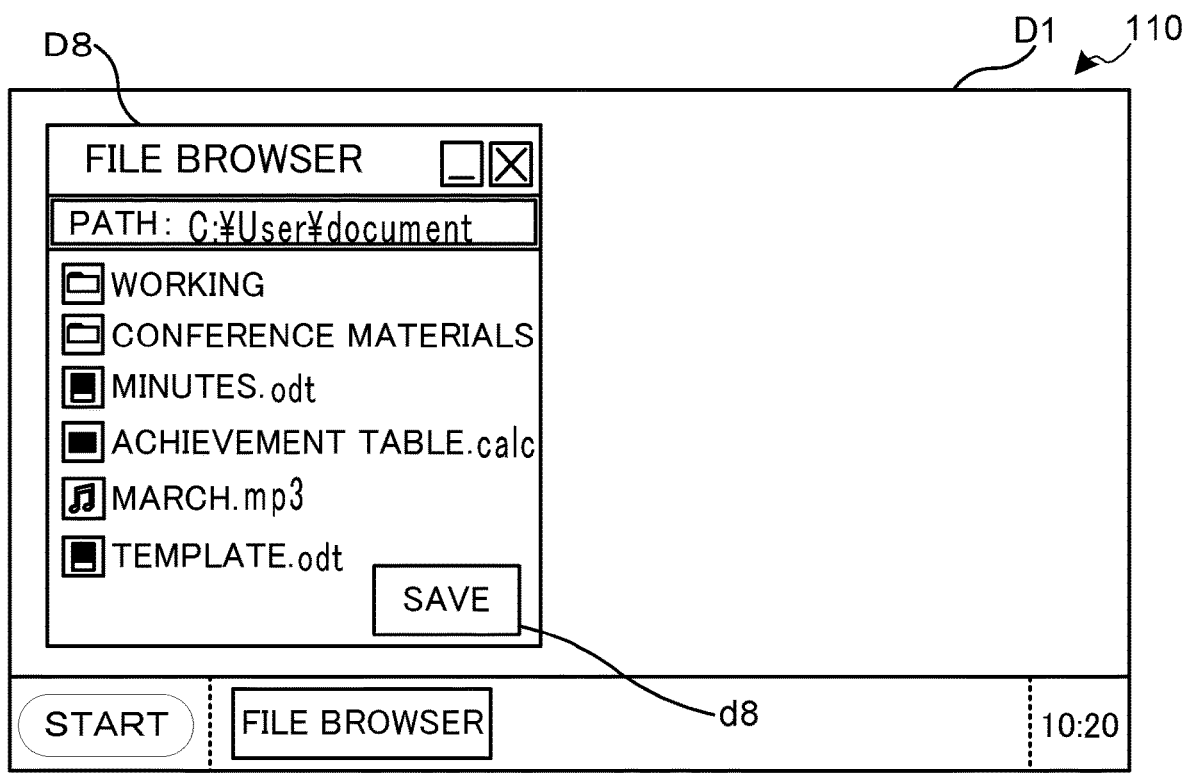
FIG. 16 is a diagram illustrating an example of an operation screen displayed on a display unit of an information processing device according to Embodiment 6 of the present disclosure.

FIG. 16 illustrates an operation screen displayed on a display unit 110 when file browser software stored in a storage 130 is performed by an information processing unit 102 in an information processing device 10 according to Embodiment 6. In the example illustrated in FIG. 16, an operation screen D8 as a processing result of the file browser software is displayed on the desktop screen D1. A button d8 is arranged on the operation screen D8 in addition to a path indicating a position of a directory in the storage 130 and a plurality of icons associated with various data (file) included in the directory. Such a button d8 is a button configured to receive a storage instruction serving as a trigger of a process of storing data associated with the plurality of icons arranged in the operation screen D8 in an external storage device 20. When the receiving unit 103 receives a selection instruction for the buttons d8, the storage controller 105 performs a process of storing the data associated with the plurality of icons arranged in the operation screen D8 in the external storage device 20.

In the information processing device 10 according to Embodiment 6, the plurality of icons arranged in the operation screen of the file browser software are associated with the predetermined storage devices 20 among the plurality of storage devices 20. Moreover, information indicating a correspondence between the plurality of icons and the predetermined storage devices 20 is stored in the storage 130 in advance. FIG. 17A is a diagram illustrating an example of data stored in the storage 130 in advance. In the example illustrated in FIG. 17A, corresponding storage devices 20 are illustrated with respect to an icon of "minutes.odt" and an icon of "achievement table.calc" among the plurality of icons arranged in the operation screen D8 illustrated in FIG. 16. For example, a predetermined storage device 20 of a personal computer A, a server A, and a smartphone A is associated with the icon of "minutes.odt."

Figure 17B:
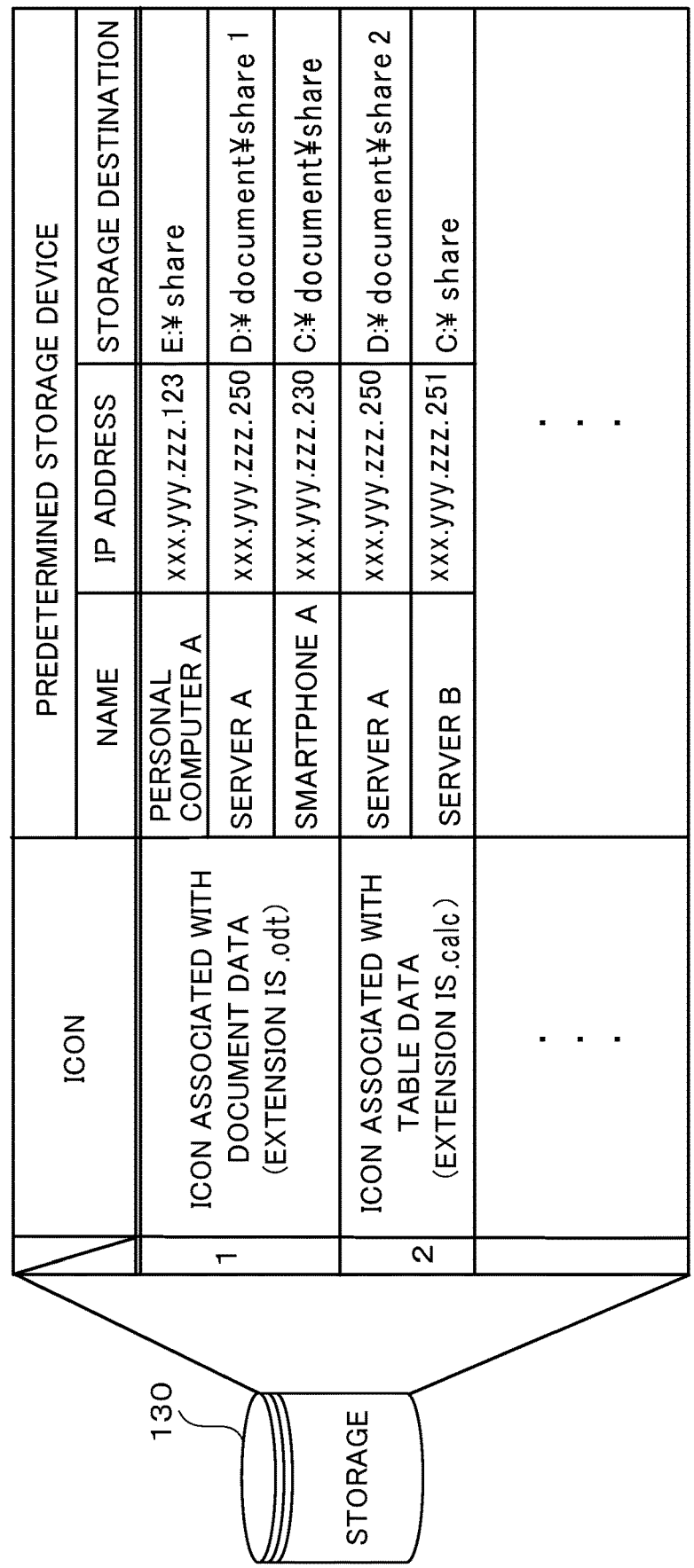

Also, FIG. 17B is a diagram illustrating another example of data stored in the storage 130 in advance. In the example illustrated in FIG. 17B, unlike the example illustrated in FIG. 17A, the storage device 20 is not associated with each specific icon name such as the icon of "minutes.odt" or the icon of "achievement table.calc," but the storage device 20 is associated with each icon type. In the example illustrated in FIG. 17B, a predetermined storage device 20 of a personal computer A, a server A, and a smartphone A is associated with an icon having an extension of odt, that is, an icon associated with document data. Furthermore, a predetermined storage device 20 of a server A and a server B is associated with an icon associated with an icon having an extension of calc, that is, an icon associated with table data.

Figure 18:
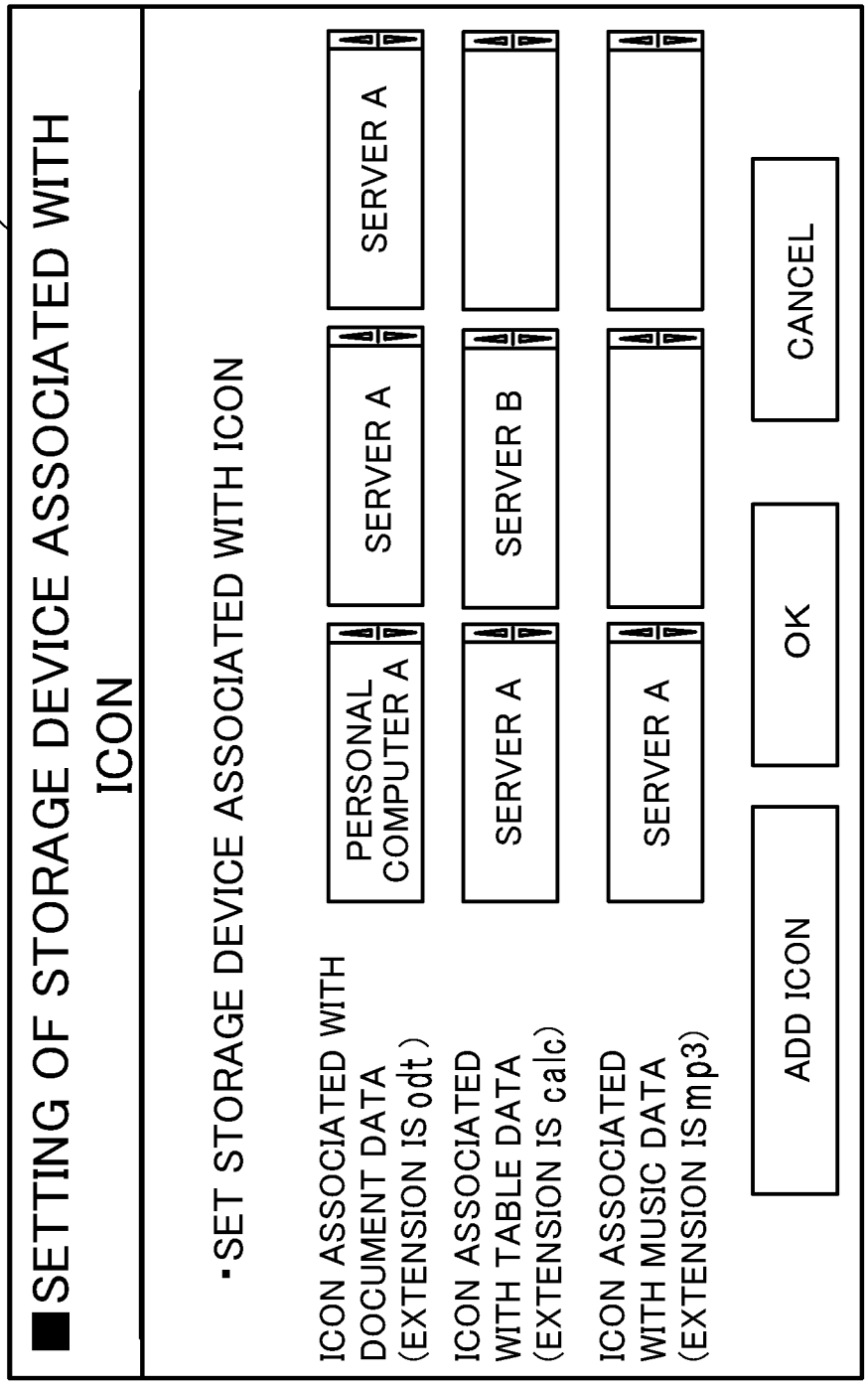
FIG. 18 is a diagram illustrating an example of a reception screen displayed on a display unit of the information processing device according to Embodiment 6 of the present disclosure.

FIG. 18 is a diagram illustrating an example of a reception screen configured to receive a setting of a correspondence between the icon and the storage device 20. The storage controller 105 generates information indicating the correspondence between the icon and the storage device 20 illustrated in FIG. 17A or FIG. 17B on the basis of an instruction received by the receiving unit 103 in a reception screen D9 illustrated in FIG. 18 and stores such generated information in the storage 130. In the example illustrated in FIG. 18, for example, a predetermined storage device 20 of a server A is associated with an icon having an extension of mp3.

Figure 19:
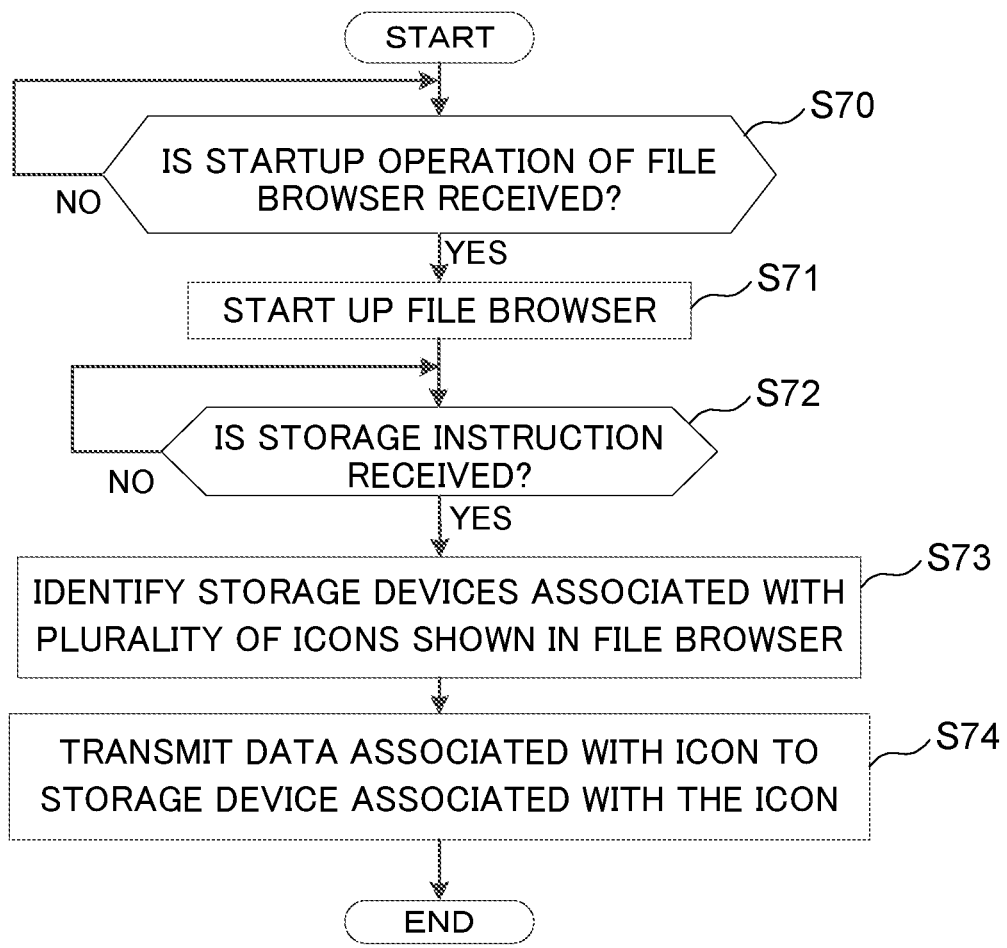
FIG. 19 is a flowchart for describing a flow of an operation by the information processing device according to Embodiment 6 of the present disclosure.

The information processing device according to Embodiment 6 performs a process of storing data associated with an icon in an external storage device 20 on the basis of the above data stored in the storage 130. FIG. 19 is a flowchart for describing a flow of such a process.

As illustrated in FIG. 19, if it is determined that the receiving unit 103 receives a startup instruction of file browser software (YES in Step S70), the information processing unit 102 starts up the file browser software (Step S71). Moreover, if it is determined that the receiving unit 103 receives a predetermined storage instruction in an operation screen of the file browser software (YES in Step S72), the storage controller 105 performs the processes of Steps S73 and S74.

In the process of Step S73, the storage controller 105 acquires data indicating a correspondence between an icon stored in the storage 130 and a storage device 20 and performs a process of identifying a storage device 20 in which such acquired data is associated with a plurality of icons arranged in the operation screen of the file browser software on the basis of the data.

Also, in the process of Step S74, the storage controller 105 controls the communication unit 140 to transmit data associated with an icon to a storage device 20 associated with such an icon. For example, when data illustrated in FIG. 17B is stored in the storage 130, an icon of "minutes.odt" and an icon of "template.odt" among a plurality of icons arranged in the operation screen D8 illustrated in FIG. 16 are transmitted to a storage device 20 of a personal computer A, a server A, and a smartphone A through the process of Step S74 and an icon of "achievement table.calc" is transmitted to a storage device of a server A and a server B.

As described above, according to the information processing device 10 and the information processing system 1 related to Embodiment 6 of the present disclosure, data associated with icons associated with data included in a specific storage area can be stored in a desired storage device 20 in a file browser screen representing a list of the icons.

Figure 20:
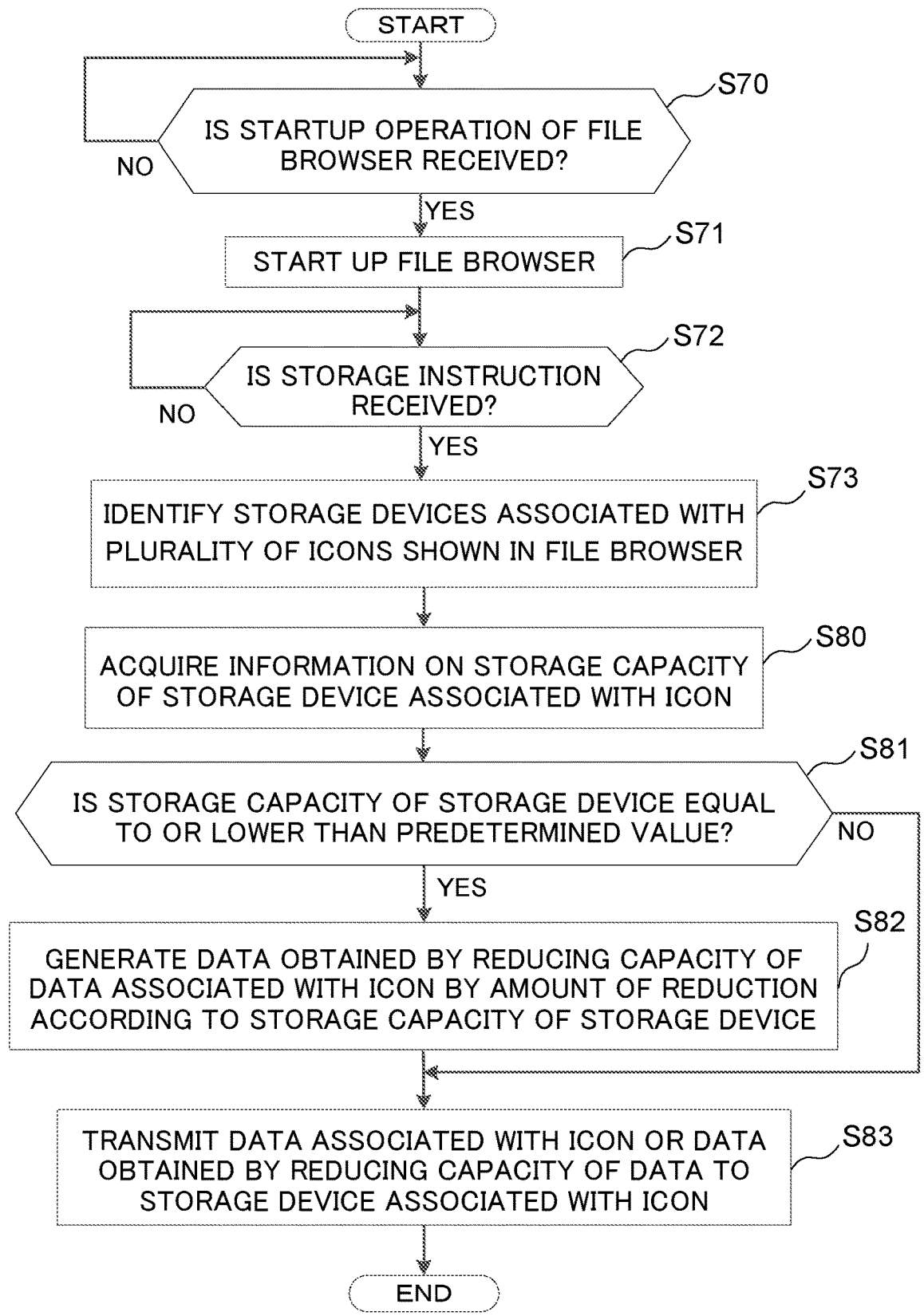
FIG. 20 is a flowchart for describing a flow of an operation by an information processing device according to a modification of Embodiment 6 of the present disclosure.

FIG. 20 is a flowchart for describing a flow of a process performed by an information processing device 10 in a modification of Embodiment 6. Note that processes with the same contents as the flowchart described with reference to FIG. 19 will be denoted with the same reference numerals and description thereof will be omitted.

After the process of Step S73, a storage controller 105 causes the communication unit 140 to communicate with a predetermined storage device 20 and acquires information on a storage capacity of a storage device 20 associated with an icon (Step S80). Moreover, if it is determined that a storage capacity of the storage device 20 associated with an icon is not equal to or lower than a predetermined threshold value (for example, 20 GB) (NO in Step S81), like in the process of Step S74 illustrated in FIG. 19, a storage controller 105 controls a communication unit 140 to transmit data associated with an icon to a storage device 20 associated with such an icon (Step S83). On the other hand, if it is determined that a storage capacity of a predetermined storage device 20 is equal to or lower than a predetermined threshold value (for example, 20 GB) (YES in Step S81), the storage controller 105 performs a process of generating data whose capacity has been reduced in accordance with the storage capacity of the storage device 20 associated with the icon (Step S82). In such processes, the storage controller 105 increases an amount of reduction (rate of reduction) of a data capacity as a storage capacity of a storage device 20 is smaller. Furthermore, in such processes, the storage controller 105 may generate data whose capacity has been reduced in accordance with an available capacity of such a predetermined storage device in addition to a storage capacity of a predetermined storage device.

After the process of Step S82, the storage controller 105 controls the communication unit 140 to transmit data whose capacity has been reduced to a storage device 20 associated with an icon (Step S83).

As described above, according to the information processing device 10 and an information processing system 1 related to a modification of Embodiment 6 of the present disclosure, data whose capacity has been reduced is transmitted to a predetermined storage device 20 having a small storage capacity so that it is possible to prevent such a storage capacity from being burdened more than necessary.

Furthermore, in the modification, the storage controller 105 may identify a storage device 20 storing data whose capacity has not been reduced among a plurality of storage devices 20 and generate link information by which the user can access the identified storage device 20. Moreover, the storage controller 105 stores such generated link information in a storage device other than the above identified storage device 20, that is, a storage device 20 storing data whose capacity has been reduced. Thus, the user can easily access the original data in the storage device 20 storing the data whose capacity has been reduced.

Embodiment 7

Figure 21:
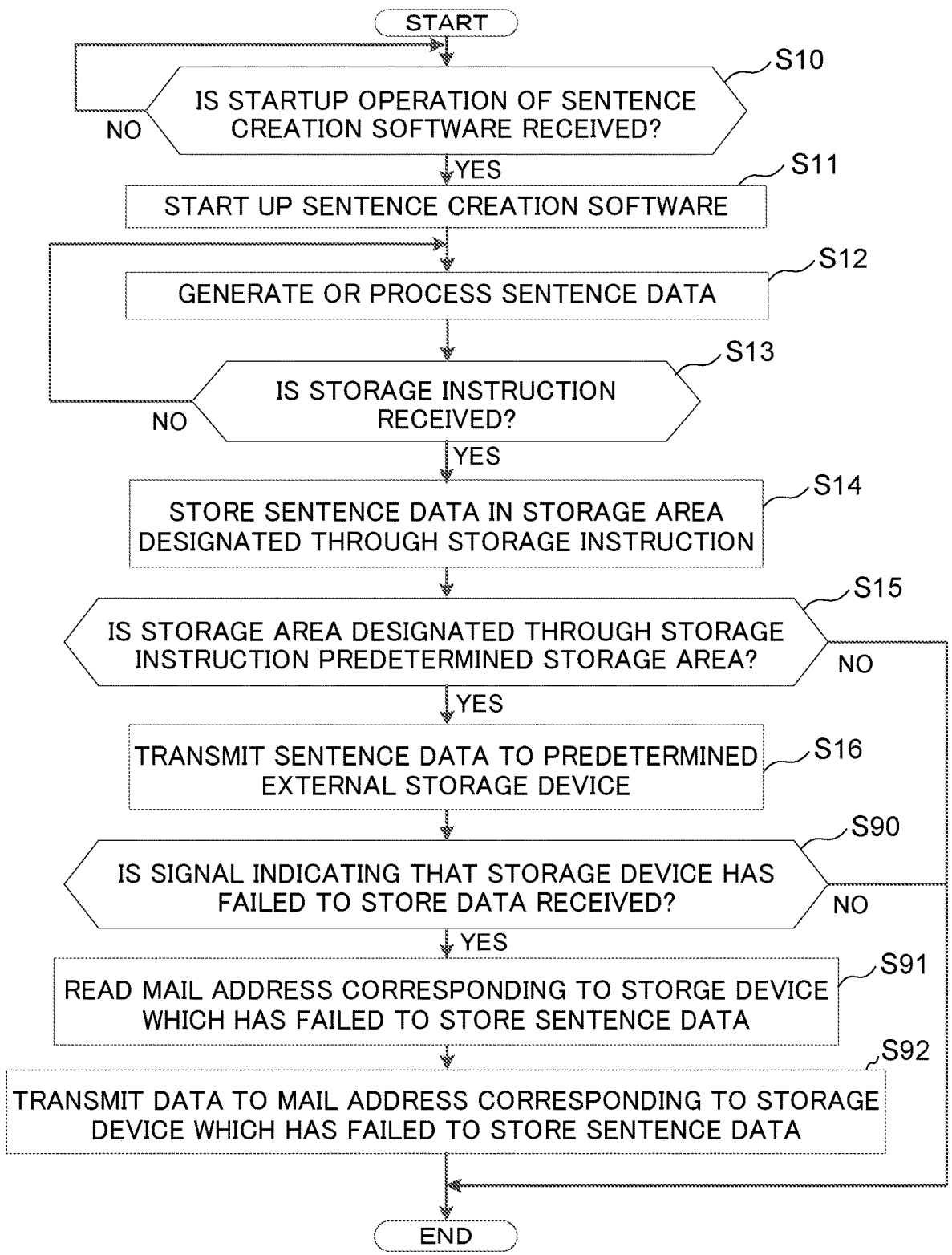
FIG. 21 is a flowchart for describing a flow of an operation by an information processing device according to Embodiment 7 of the present disclosure.

FIG. 21 is a flowchart for describing a flow of an operation by an information processing device 10 according to Embodiment 7. Note that processes with the same contents as the flowchart described with reference to FIG. 4 will be denoted with the same reference numerals and description thereof will be omitted.

A storage controller 105 performs a process of causing a communication unit 140 to transmit the same document data as document data stored in a storage 130 to a predetermined storage device 20 (Step S16) and then the storage controller 105 determines whether the communication unit 140 receives a signal indicating that a storage device 20 serving as a data transmission destination has failed to store data during a predetermined time after the process of Step S16 (Step S90).

If it is determined that the communication unit 140 have not received a signal indicating that the storage device 20 serving as a data transmission destination has failed to store data during a predetermined time after the process of Step S16 (NO in Step S90), the storage controller 105 ends the process. Note that a case in which it is determined that a determination result in Step S90 is NO includes a case in which the communication unit 140 receives a signal indicating that the storage of the data has been successfully performed from a storage device 20 serving as a data transmission destination during a predetermined time.

On the other hand, if it is determined that the communication unit 140 have received a signal indicating that the storage device 20 serving as a data transmission destination has failed to store data during a predetermined time after the process of Step S16 (YES in Step S90), the storage controller 105 performs processes of Steps S91 and S92.

FIG. 22 is a diagram illustrating an example of data stored in the storage 130 in advance. As illustrated in FIG. 22, the storage 130 stores information indicating a predetermined storage device 20 connected to the information processing device 10 via a network N among a plurality of storage devices 20 and information indicating a mail address corresponding to such a predetermined storage device. In the process of Step S90, the storage controller 105 acquires the information indicating the mail address corresponding to the predetermined storage device from the storage 130. Moreover, in the process of Step S91, the storage controller 105 transmits document data to a mail address corresponding to a storage device 20 which has failed to store sentence data on the basis of such acquired information.

In this way, in the information processing device 10 according to Embodiment 7, in the process of Step S92, the storage controller 105 causes the communication unit 140 to transmit document data again in a method different from that of the data transmission performed in the process of Step S16. (1) Occurrence of an error concerning communication, (2) an insufficient available capacity of a storage device 20 serving as a storage destination, (3) there is no access right of a storage device 20 serving as a storage destination, or the like may be considered as factors in which the storage device 20 fails to store data, but it is possible to more reliably store data in the storage device 20 by transmitting document data again in the method different from the data transmission performed in the process of Step S16 as described above.

Figure 23A:
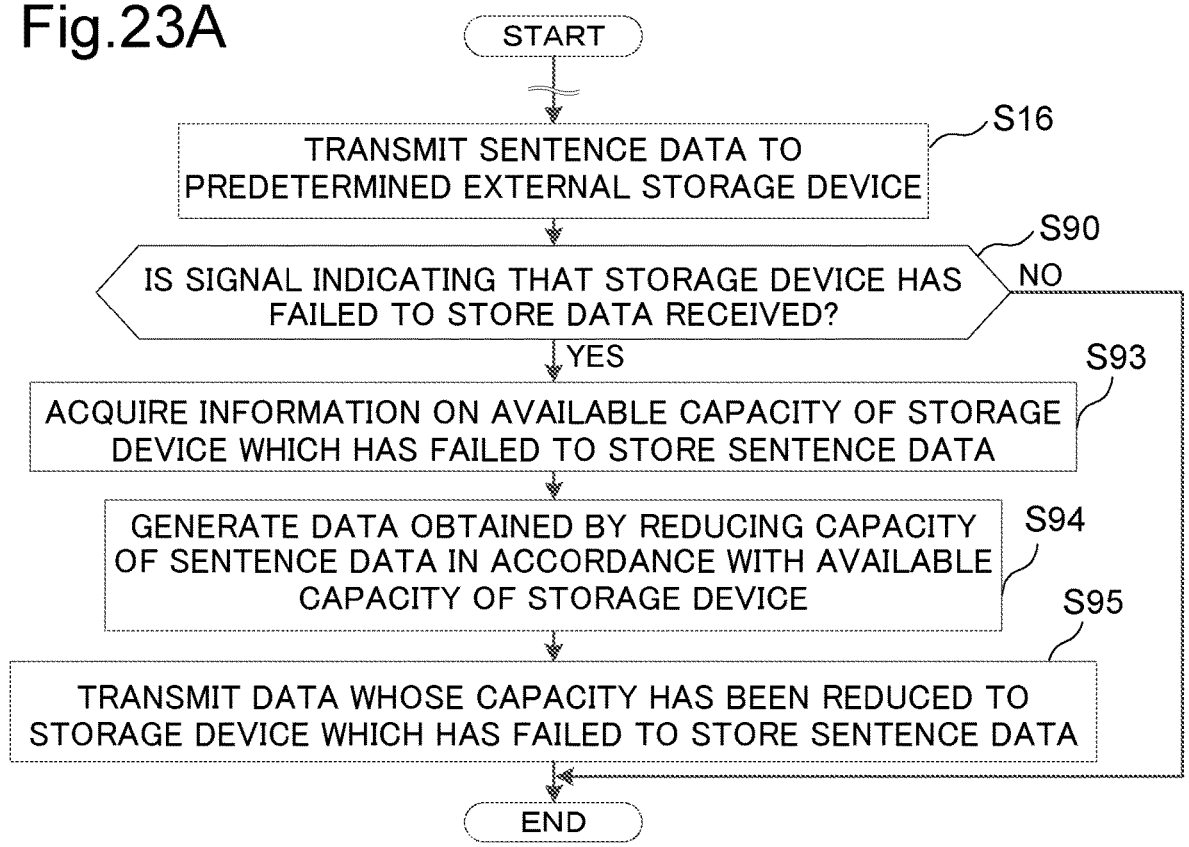
FIGS. 23A and 23B are a flowchart for describing a flow of an operation by an information processing device according to a modification of Embodiment 7 of the present disclosure.

Note that, although a case in which data is transmitted again using a mail address has been described in the above description, the present disclosure is not necessarily limited to such a case. FIG. 23A is a flowchart for describing a flow of a process of an information processing device 10 according to a modification of Embodiment 7. Note that processes with the same contents as the flowchart described with reference to FIG. 21 will be denoted with the same reference numerals and description thereof will be omitted.

If it is determined that the communication unit 140 have received a signal indicating that the storage device 20 serving as a data transmission destination has failed to store data during a predetermined time after the process of Step S16 (YES in Step S90), the storage controller 105 controls the communication unit 140 to acquire information of an available capacity of a storage device 20 which has failed to store sentence data (Step S93). Moreover, the storage controller 105 generates data obtained by reducing a sentence data capacity in accordance with an available capacity of such a storage device 20 (Step S94). To be specific, the storage controller 105 reduces a document data capacity so that the capacity is equal to or lower than the available capacity of the storage device 20. In addition, the storage controller 105 controls the communication unit 140 to transmit data whose capacity has been reduced generated by the process in Step S94 to a storage device 20 which has failed to store sentence data (Step S95).

Figure 23B:
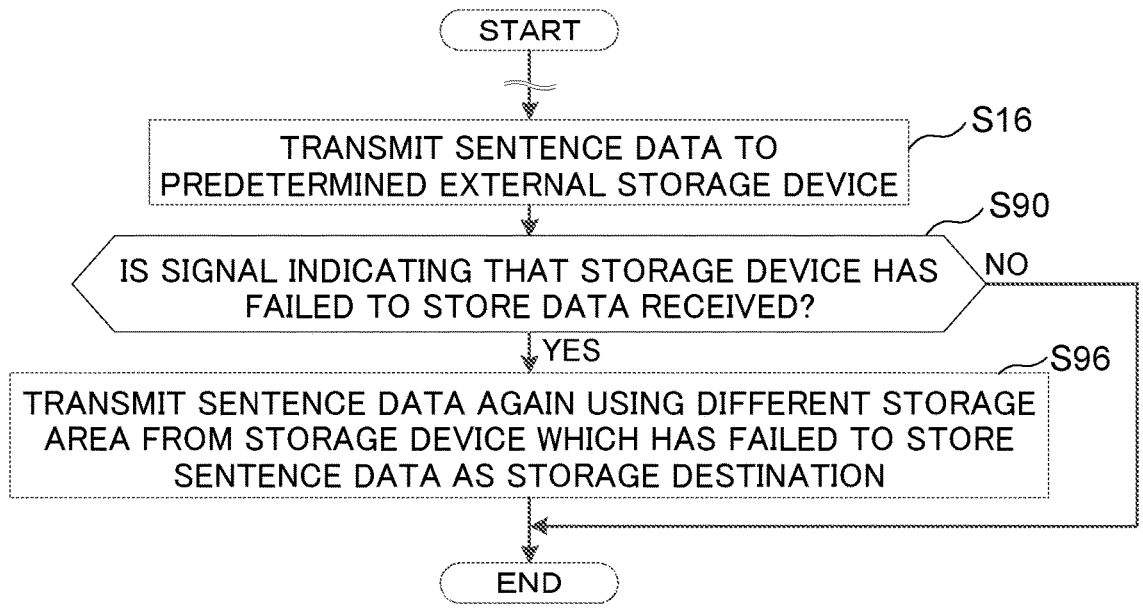

Also, FIG. 23B is a flowchart for describing a flow of a process of an information processing device 10 according to another modification of Embodiment 7. Note that processes with the same contents as the flowchart described with reference to FIG. 21 will be denoted with the same reference numerals and description thereof will be omitted.

If it is determined that the communication unit 140 have received a signal indicating that the storage device 20 serving as a data transmission destination has failed to store data during a predetermined time after the process of Step S16 (YES in Step S90), the storage controller 105 controls a communication unit 140 to transmit data for designating a storage area different from the storage area designated as the storage destination in the process of Step S16 to a predetermined storage device 20 (Step S96).

Figure 24:
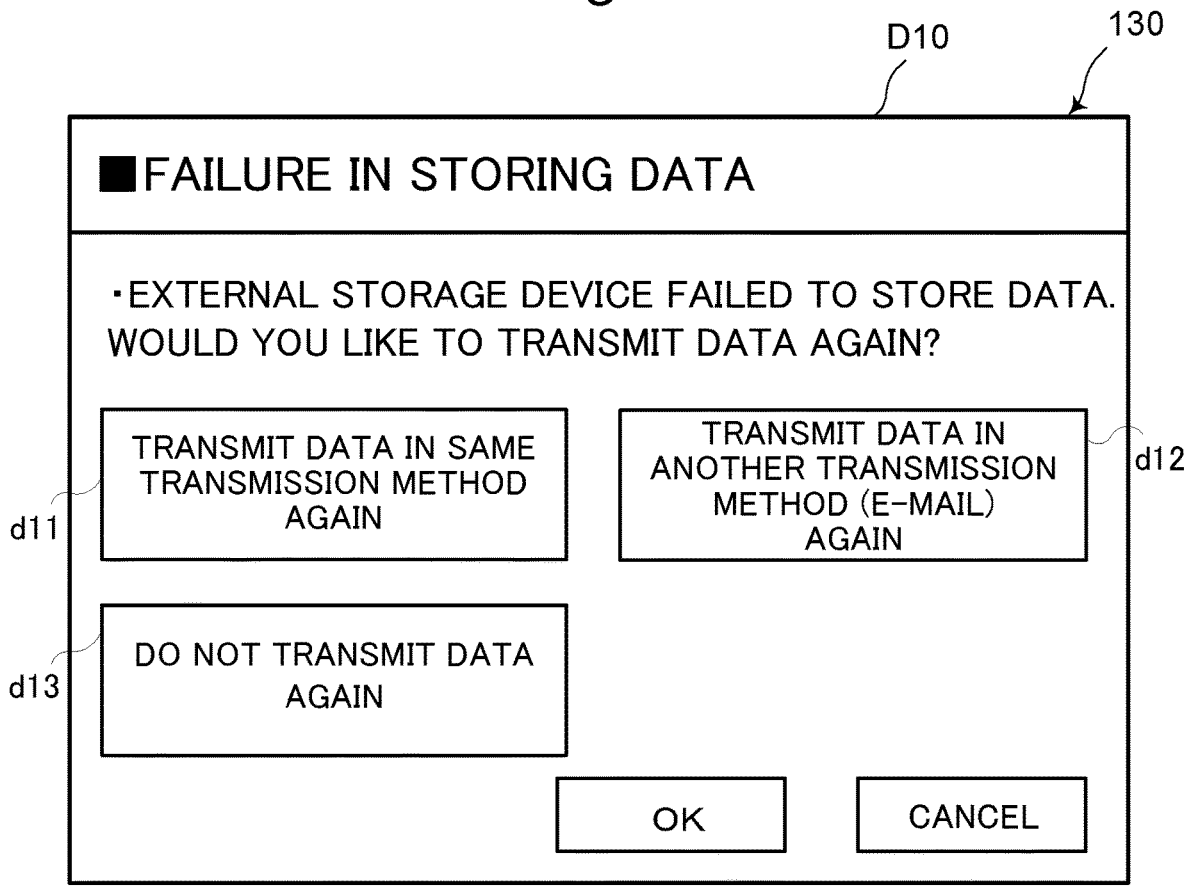
FIG. 24 is a diagram illustrating an example of a setting screen displayed on a display unit of the information processing device according to Embodiment 7 of the present disclosure.

Also, when the communication unit 140 receives a signal indicating that a storage device 20 has failed to store data, that is, a determination in the process of Step S90 is YES, the display controller 104 may cause a display unit 110 to display a setting screen illustrated in FIG. 24. A setting screen D10 shows that an external storage device 20 has failed to store data. Furthermore, a plurality of buttons d11, d12, and d13 are arranged in the setting screen D10. The storage controller 105 determines a process to be performed in accordance with a button selected by a receiving unit 103 in such a setting screen D10. For example, when the receiving unit 103 receives a selection operation of the button d11, the storage controller 105 causes the communication unit 140 to transmit document data again in the same manner as the data transmission performed in the process of Step S16. Furthermore, when the receiving unit 103 receives a selection operation of the button d12, the storage controller 105 causes the communication unit 140 to transmit document data again in a method of an e-mail different from the data transmission performed in the process of Step S16. When the receiving unit 103 receives a selection operation of the button d13, the storage controller 105 does not transmit document data again. When an external storage device 20 has failed to store data by performing the above-described process, it is possible to cause the information processing device 10 to transmit data to the information processing device 10 again in a process desired by the user.

Also, in the above modification, the storage controller 105 may identify a storage device 20 which has succeeded in storing data among a plurality of storage devices 20 and generate link information by which the user can access such an identified storage device 20. Moreover, the storage controller 105 stores such link information in a storage device other than the above identified storage device 20, that is, a storage device 20 which has failed to store data. When a storage device 20 has failed to store data due to an insufficient available capacity, the storage device 20 can store data if the data is light link information. Thus, the user can access the original data in such a storage device 20 even in the storage device 20 which has failed to store data due to an insufficient available capacity.

Embodiment 8

Figure 25:
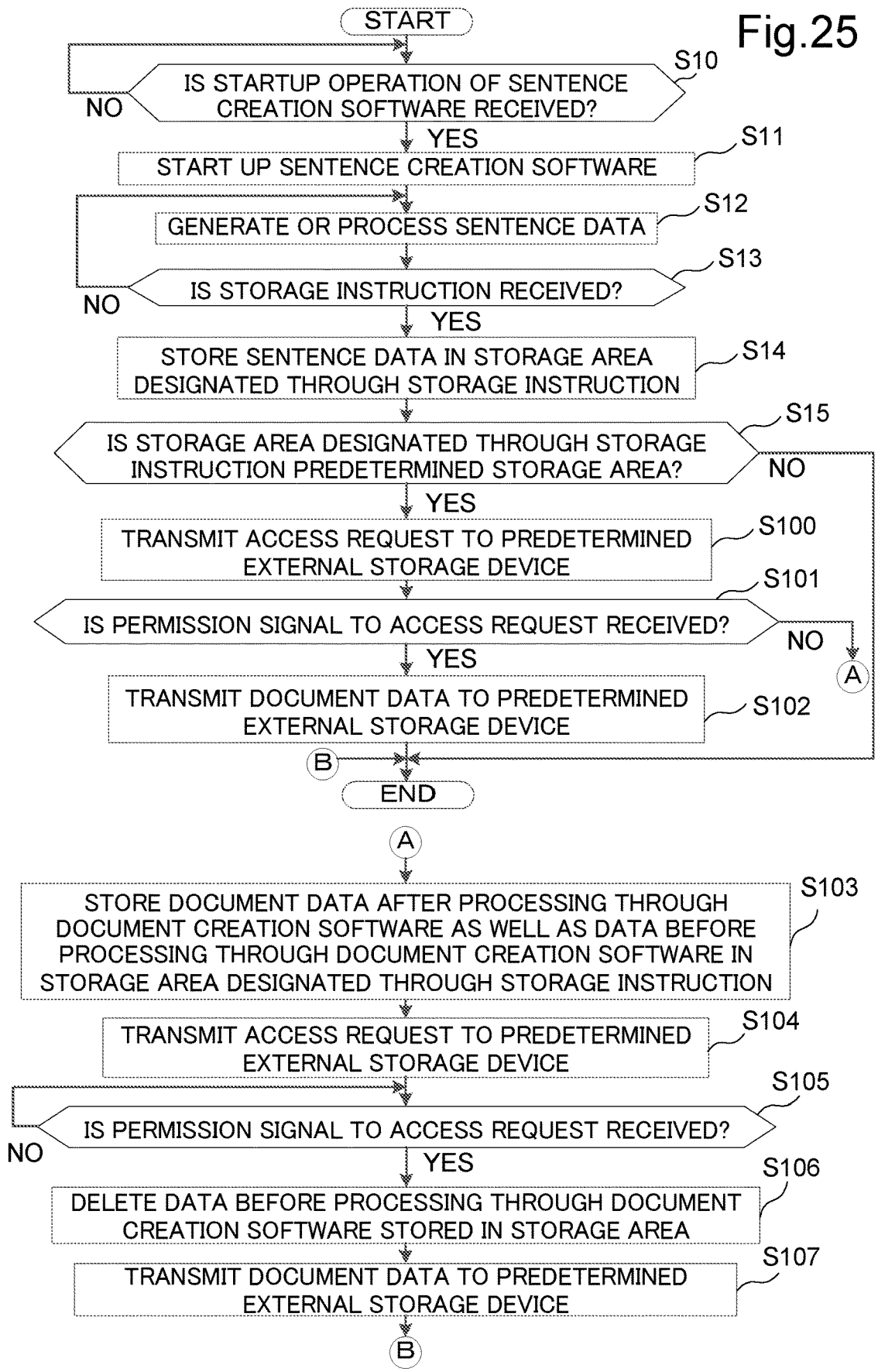
FIG. 25 is a flowchart for describing a flow of an operation by an information processing device according to Embodiment 8 of the present disclosure.

FIG. 25 is a flowchart for describing a flow of an operation by an information processing device 10 according to Embodiment 8. Note that processes with the same contents as the flowchart described with reference to FIG. 4 will be denoted with the same reference numerals and description thereof will be omitted.

If it is determined that a storage area designated through a storage instruction is a predetermined storage area (YES in Step S15), the storage controller 105 controls the communication unit 140 to transmit an access request to a predetermined storage device 20 before document data is transmitted (Step S100).

Also, if it is determined that the communication unit 140 receives a permission signal for an access request from a storage device 20 within a predetermined time after the process of Step S100 (YES in Step S101), the communication unit 140 is controlled to transmit document data to a predetermined storage device 20 (Step S102).

On the other hand, if it is determined that the communication unit 140 does not receive a permission signal for an access request from the storage device 20 within a predetermined time after the process of Step S100 (NO in Step S101), the storage controller 105 stores data before processing through the process of Step S12 in a storage area designated through a storage instruction in Step S13 in addition to document data after processing through the process of Step S12 (Step S103). At this time, the storage controller 105 gives a name (a file name) different from that of the document data after the processing through the process of Step S12 to the data before the processing through the process of Step S12 and stores the data in a storage area designated through a storage instruction. Note that a case in which it is determined that a determination result in Step S101 is NO also includes a case in which the communication unit 140 receives a non-permission signal for an access request from a predetermined storage device 20.

After the process of Step S103, the storage controller 105 controls the communication unit 140 to an access request again to a predetermined storage device 20 (Step S104). Moreover, if it is determined that the communication unit 140 receives a permission signal for an access request from the storage device 20 within a predetermined time after the process of Step S104 (YES in Step S105), the storage controller 105 deletes data before the processing through the process of Step S12 from the storage 130 (Step S106) and then controls the communication unit 140 to transmit the data after the processing through the process of Step S12 to a predetermined storage device 20 (Step S107).

As described above, according to the information processing device 10 and an information processing system 1 according to Embodiment 8, since an predetermined external storage device 20 obtains access permission and then data is transmitted from the predetermined external storage device 20, it is possible to more reliably store the data in the storage device 20. Furthermore, when access permission for a predetermined storage device 20 cannot be obtained, data before the processing through the process of Step S12 as well as data after the processing through the process of Step S12 are stored in the storage 130 so that it is possible to restore sentence data in a state before the change when the user wishes.

Note that, in a modification according to Embodiment 8, a transmission process of the access request may be performed only when a user of the information processing device 10 is different from a user of a predetermined storage device 20, and data may be transmitted to the predetermined storage device without performing a transmission process of the access request when the user of the information processing device 10 is the same as the user of the predetermined storage device 20. In this case, user information indicating a user of a predetermined storage device 20 is be stored in the storage 130 in advance. The storage controller 105 determines the user of the information processing device 10 is different from the user of the predetermined storage device 20 on the basis of such user information.

Also, in another modification according to Embodiment 8, when a permission signal for an access request is not transmitted from a predetermined storage device 20 or the communication unit 140 receives a non-permission signal for an access request from a predetermined storage device 20, the storage controller 105 may transmit data using an e-mail. In this case, a mail address corresponding to the predetermined storage device 20 is stored in the storage 130 in advance. The storage controller 105 identifies a mail address corresponding to the predetermined storage device 20 on the basis of such information and mails data to such a mail address.

Note that the present disclosure is not limited to the configurations of the above embodiments and various modifications are possible.

A program described in the above embodiments and modifications may be recorded in a computer-readable non-transitory recording medium, for example, a hard disk, a compact disc read-only memory (CD-ROM), a digital versatile disk (DVD)-ROM, a semiconductor memory, or the like.

Also, the configurations described in the above embodiments and modifications may be partially combined. For example, the above embodiments described using sentence data can also be applied to a plurality of sheets of table data or a plurality of areas constituting table data. Likewise, the above embodiments described using table data can also be applied to sentence data or a plurality of areas constituting table data.

While the present disclosure has been described in detail with reference to the embodiments thereof, it would be apparent to those skilled in the art the various changes and modifications may be made therein within the scope defined by the appended claims.

What is claimed is:
1. An information processing device comprising:
a storage;
a communication unit configured to be able to communicate with a plurality of storage devices via a network; and
a control unit including a processor and functioning, when the processor executes a control program, as:
a receiving unit configured to receive an instruction from a user;
a processing unit configured to generate or process data constituted of a plurality of sheets in response to the instruction received by the receiving unit; and a storage controller configured to perform storage control on the data generated or processed by the processing unit, wherein the plurality of sheets of the data are associated with predetermined storage devices among the plurality of storage devices and information indicating a correspondence between the plurality of sheets and the predetermined storage devices is stored in the storage in advance, when the receiving unit receives a predetermined storage instruction, the storage controller performs a process of storing the data in the storage and causing the communication unit to transmit data indicating the plurality of sheets to the storage devices associated with the sheets with respect to each of the plurality of sheets, and stores the transmitted data in the storage devices, and the storage controller identifies a storage device storing data indicating all sheets of the data generated or processed by the processing unit among the plurality of predetermined storage devices, generates link information by which the user can access the identified storage device, and stores the generated link information in a storage device other than the identified storage device among the plurality of predetermined storage devices.

2. The information processing device according to claim 1, wherein, when all sheets of the data has been stored in the storage device, the storage controller receives a signal indicating storage completion transmitted from the storage device via the communication unit, receives the signal transmitted from the storage device storing the data indicating all sheets, and then causes the communication unit to transmit the link information.

3. An information processing device comprising:
  a storage;
  a communication unit configured to be able to communicate with a plurality of storage devices via a network; and
  a control unit including a processor and functioning, when the processor executes a control program, as:
  a receiving unit configured to receive an instruction from a user;
  a processing unit configured to generate or process data constituted of a plurality of sheets in response to the instruction received by the receiving unit; and
  a storage controller configured to perform storage control on the data generated or processed by the processing unit,
  wherein the plurality of sheets of the data are associated with predetermined storage devices among the plurality of storage devices and information indicating a correspondence between the plurality of sheets and the predetermined storage devices is stored in the storage in advance,
  when the receiving unit receives a predetermined storage instruction, the storage controller performs a process of storing the data in the storage and causing the communication unit to transmit data indicating the plurality of sheets to the storage devices associated with the sheets with respect to each of the plurality of sheets, and stores the transmitted data in the storage devices, and
  when the storage controller is unable to identify the storage device storing data indicating all sheets of data generated or processed by the processing unit, the storage controller determines whether a combination of sheets stored in the plurality of storage devices among the plurality of predetermined storage devices is to be the data indicating all sheets, and when it is determined that the combination of sheets is to be the data indicating all sheets, the storage controller generates link information by which the user is able to access each of the plurality of storage devices storing the data indicating the sheets, and stores, on the plurality of predetermined storage devices, the generated link information and the data indicating the sheets.

4. The information processing device according to claim 3, wherein when the data has been stored in the storage device, the storage controller receives a signal indicating storage completion transmitted from the storage device via the communication unit, receives all of the signals transmitted from the plurality of storage devices storing the data indicating the sheets, and then causes the communication unit to transmit the link information.

5. An information processing system comprising:
  the information processing device according to claim 1, and
  the plurality of storage devices.

6. An information processing method which controls an information processing device including a storage and a communication unit capable of communicating with a plurality of storage devices via a network, the information processing method including:
  a receiving step of receiving an instruction from a user;
  a processing step of generating or processing data constituted of a plurality of sheets in response to the instruction received in the receiving step; and
  a storage controlling step of performing storage control of the data generated or processed in the processing step,
  wherein, in the information processing device, the plurality of sheets of the data are associated with predetermined storage devices among the plurality of storage devices and information indicating a correspondence between the plurality of sheets and the predetermined storage devices is stored in the storage in advance,
  when a predetermined storage instruction is received in the receiving step, in the storage controlling step, a process of storing the data in the storage and causing the communication unit to transmit the data indicating the sheets to the storage device associated with the sheets with respect to each of the plurality of sheets is performed, and the transmitted data is stored in the storage devices, and
  in the storage controlling step, a storage device storing data indicating all sheets of the data generated or processed by the processing unit is identified among the plurality of predetermined storage devices, link information by which the user can access the identified storage device is generated, and the generated link information is stored in a storage device other than the identified storage device among the plurality of predetermined storage devices.

* * * * *